US012673712B2

(12) United States Patent
Fisher

(10) Patent No.: US 12,673,712 B2
(45) Date of Patent: Jul. 7, 2026

(54) CARGO TRANSPORT SYSTEM AND METHOD

(71) Applicant: The Shyft Group, Inc., Charlotte, MI (US)

(72) Inventor: Eric R. Fisher, Elkhart, IN (US)

(73) Assignee: The Shyft Group, Inc., Charlotte, MI (US)

( * ) Notice: Subject to any disclaimer, the term of this patent is extended or adjusted under 35 U.S.C. 154(b) by 835 days.

(21) Appl. No.: 17/945,349

(22) Filed: Sep. 15, 2022

(65) Prior Publication Data

US 2023/0084587 A1     Mar. 16, 2023

Related U.S. Application Data

(60) Provisional application No. 63/295,965, filed on Jan. 3, 2022, provisional application No. 63/248,688, filed on Sep. 27, 2021, provisional application No. 63/244,937, filed on Sep. 16, 2021.

(51) Int. Cl.
| | |
|---|---|
| *B62B 5/06* | (2006.01) |
| *B62B 3/02* | (2006.01) |
| *B62B 5/00* | (2006.01) |
| *B62B 5/02* | (2006.01) |
| *B62D 51/00* | (2006.01) |
| *B62D 51/02* | (2006.01) |
| *B62D 55/02* | (2006.01) |

(52) U.S. Cl.
CPC ............... *B62B 5/067* (2013.01); *B62B 3/02* (2013.01); *B62B 5/00* (2013.01); *B62B 5/02*

(2013.01); *B62D 51/007* (2013.01); *B62D 51/02* (2013.01); *B62D 55/02* (2013.01)

(58) Field of Classification Search
CPC ...... B62D 55/02; B62D 55/04; B62D 55/075; B62B 3/02; B62B 5/067
See application file for complete search history.

(56) References Cited

U.S. PATENT DOCUMENTS

| | | | | | |
|---|---|---|---|---|---|
| 3,823,790 | A | * | 7/1974 | Richison ................ | A61G 5/066 |
| | | | | | 180/6.7 |
| 7,438,308 | B2 | * | 10/2008 | Kim .......................... | B62B 5/06 |
| | | | | | 280/655 |
| 7,475,745 | B1 | * | 1/2009 | DeRoos ................. | B62D 55/02 |
| | | | | | 180/8.1 |

(Continued)

FOREIGN PATENT DOCUMENTS

| | | | | |
|---|---|---|---|---|
| EP | 1502843 A2 * | 2/2005 | ............. | B62D 11/00 |
| EP | 3176060 A2 * | 6/2017 | ............. | B62D 55/02 |

(Continued)

*Primary Examiner* — Bobby Rushing, Jr.
(74) *Attorney, Agent, or Firm* — Barnes & Thornburg LLP

(57) ABSTRACT

An electronic cart with an electronic cart body including one or more internal compartments. The cart includes one or more wheels and/or a track assembly supporting the electronic cart body. One or more batteries are carried by the electronic cart body. The cart has a drive system to drive the one or more wheels and/or the track assembly, which is powered, at least in part, by the one or more batteries. One or more hand-operated cart controls are provided on the cart to adjust at least a speed with which the drive system drives the one or more wheels and/or the track assembly.

22 Claims, 27 Drawing Sheets

(56)                   References Cited

U.S. PATENT DOCUMENTS

| | | | | |
|---|---|---|---|---|
| 7,654,348 | B2 * | 2/2010 | Ohm .................... | B62D 55/065 |
| | | | | 180/8.5 |
| 10,442,479 | B2 * | 10/2019 | Chan ........................ | B60N 2/14 |
| 10,696,316 | B1 * | 6/2020 | Parks ........................ | B62B 9/02 |
| 2014/0332291 | A1 * | 11/2014 | Zonzini .................... | B62B 3/02 |
| | | | | 180/9.42 |
| 2021/0070339 | A1 * | 3/2021 | Delgatty ................ | B60N 3/104 |

FOREIGN PATENT DOCUMENTS

| | | | | | | |
|---|---|---|---|---|---|---|
| JP | 60176871 | A | * | 9/1985 | | |
| KR | 100780811 | B1 | * | 11/2007 | | |
| KR | 101109545 | B1 | * | 1/2012 | | |
| KR | 101379594 | B1 | * | 9/2013 | | |
| KR | 102035090 | B1 | * | 10/2019 | | |
| WO | WO-2016208060 | A1 | * | 12/2016 | .............. | B62B 5/04 |

* cited by examiner

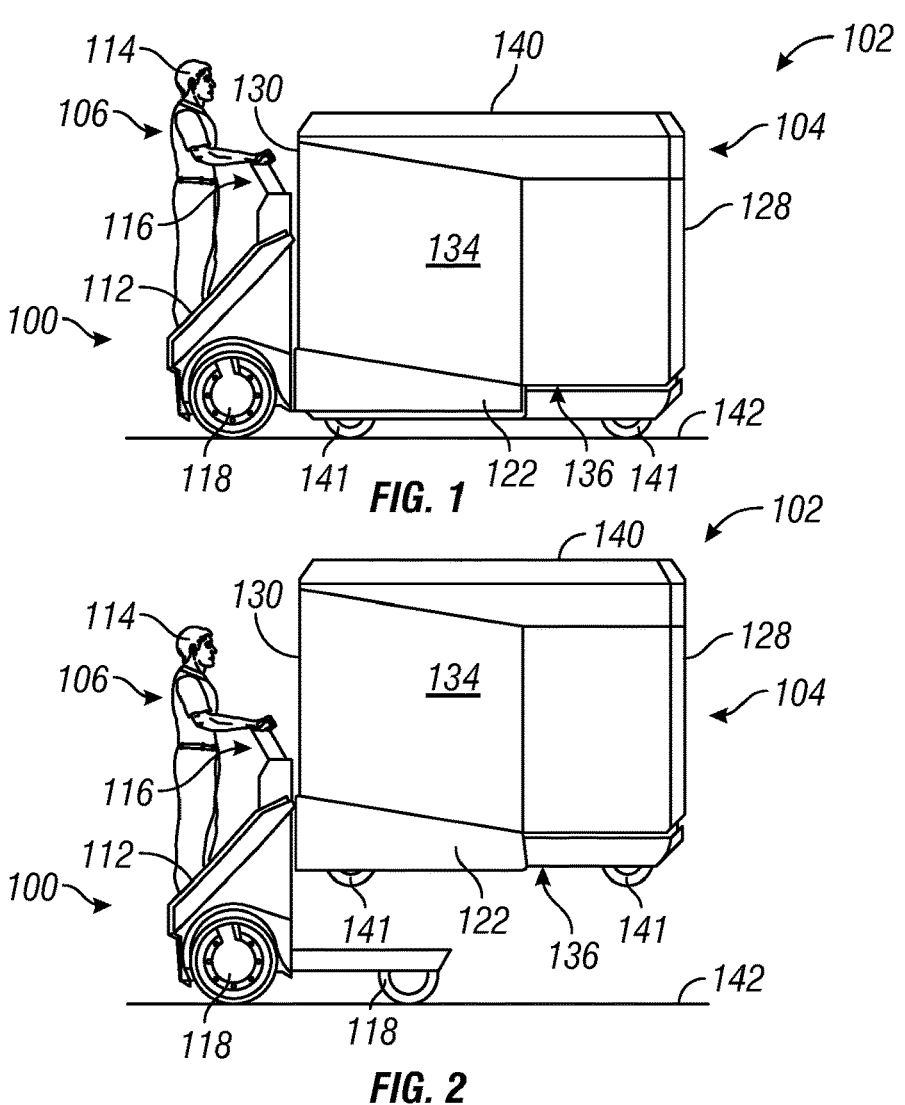
FIG. 1
FIG. 2
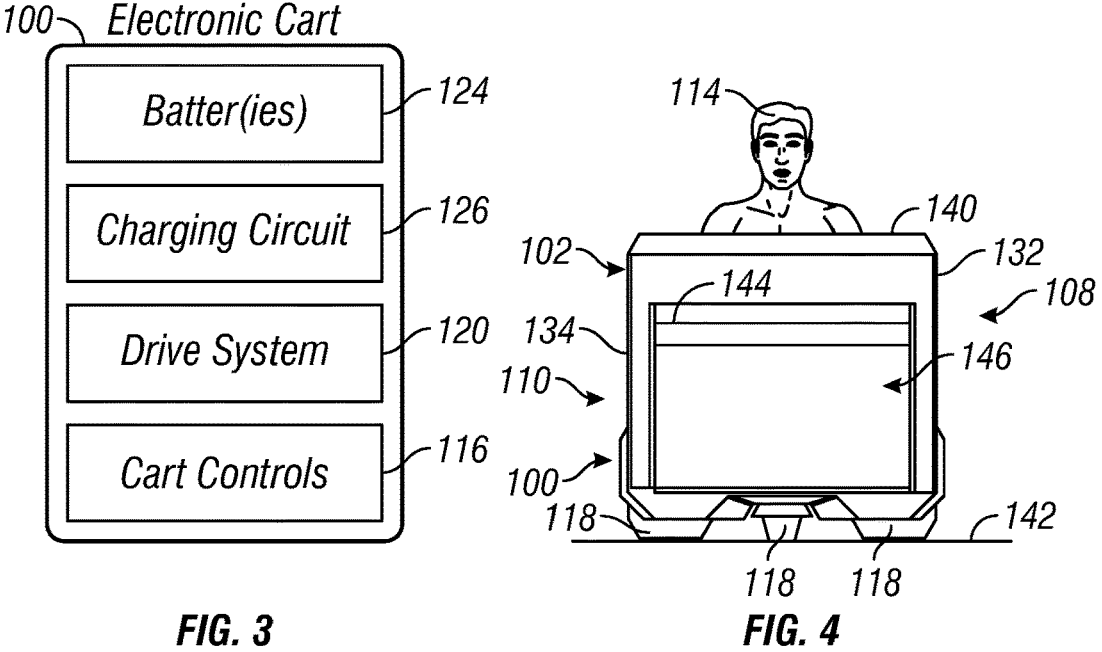
100 Electronic Cart
- Batter(ies) — 124
- Charging Circuit — 126
- Drive System — 120
- Cart Controls — 116
FIG. 3
FIG. 4

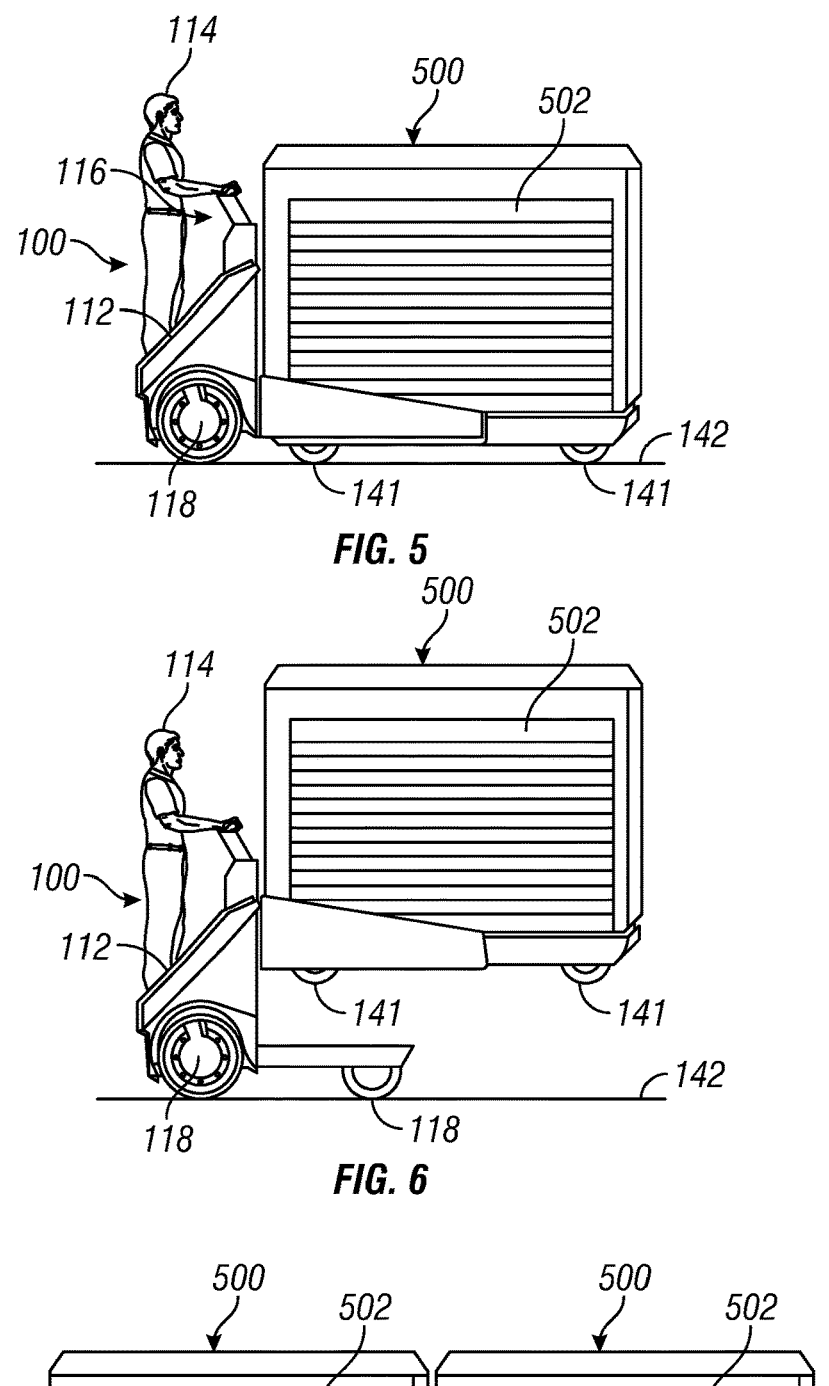
FIG. 5
FIG. 6
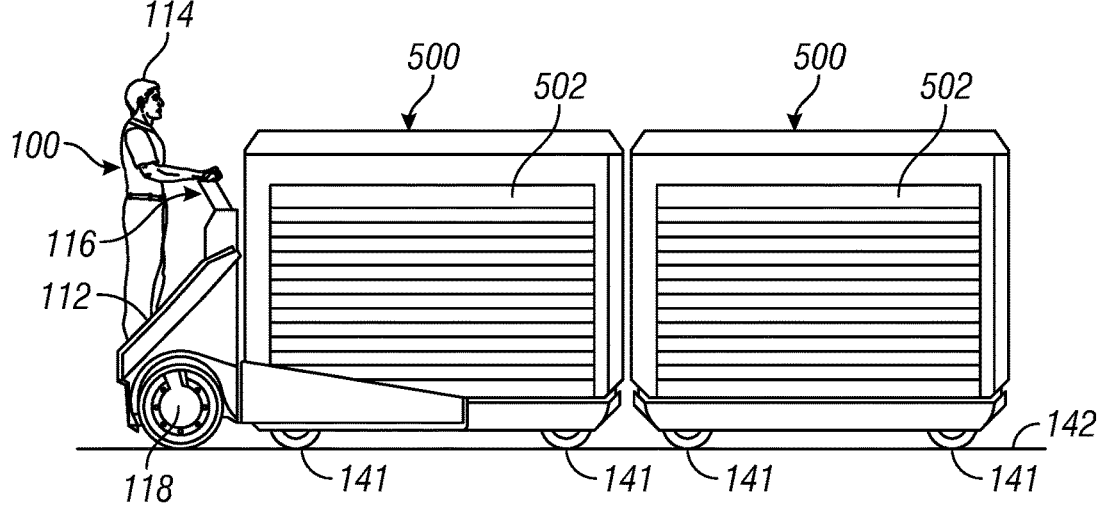
FIG. 7

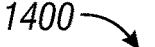
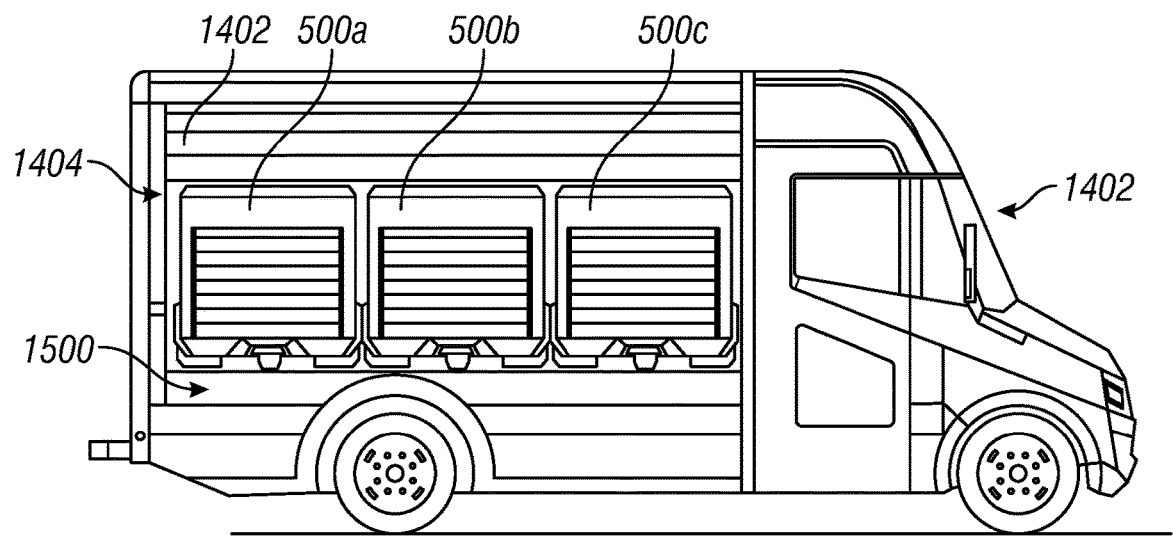
FIG. 15
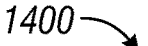
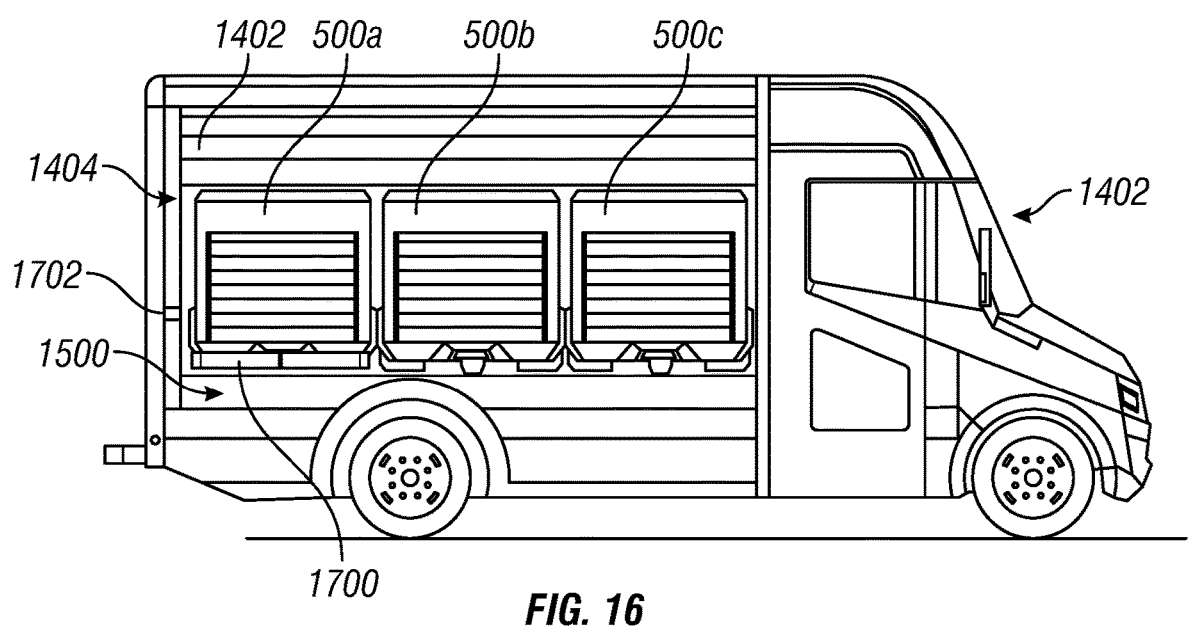
FIG. 16

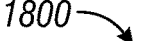
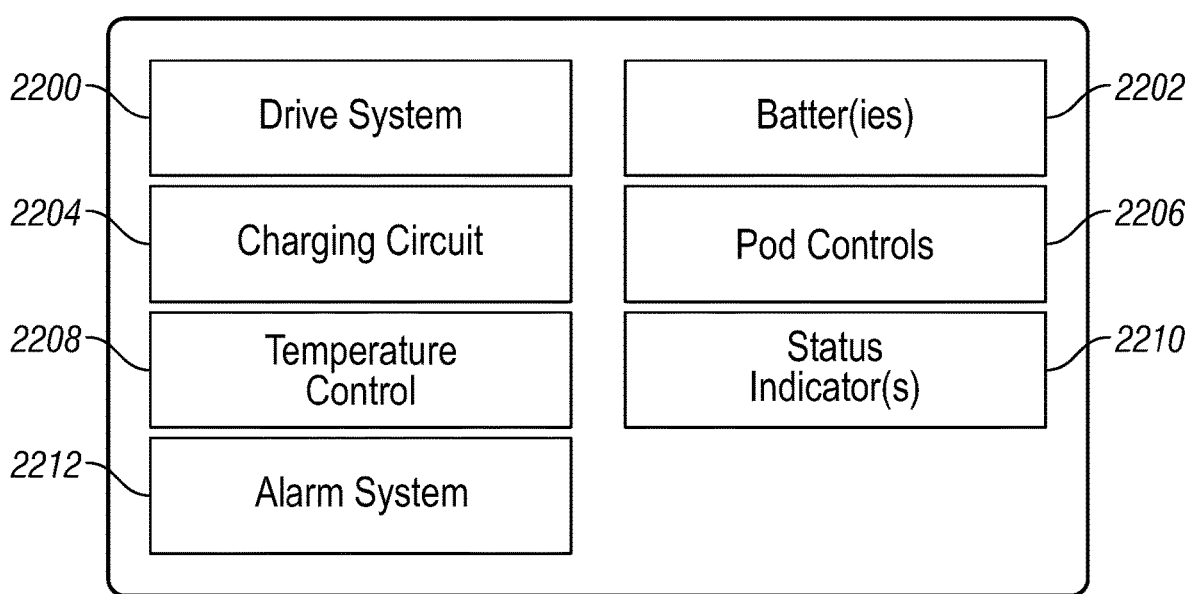
FIG. 22

Figure 48:
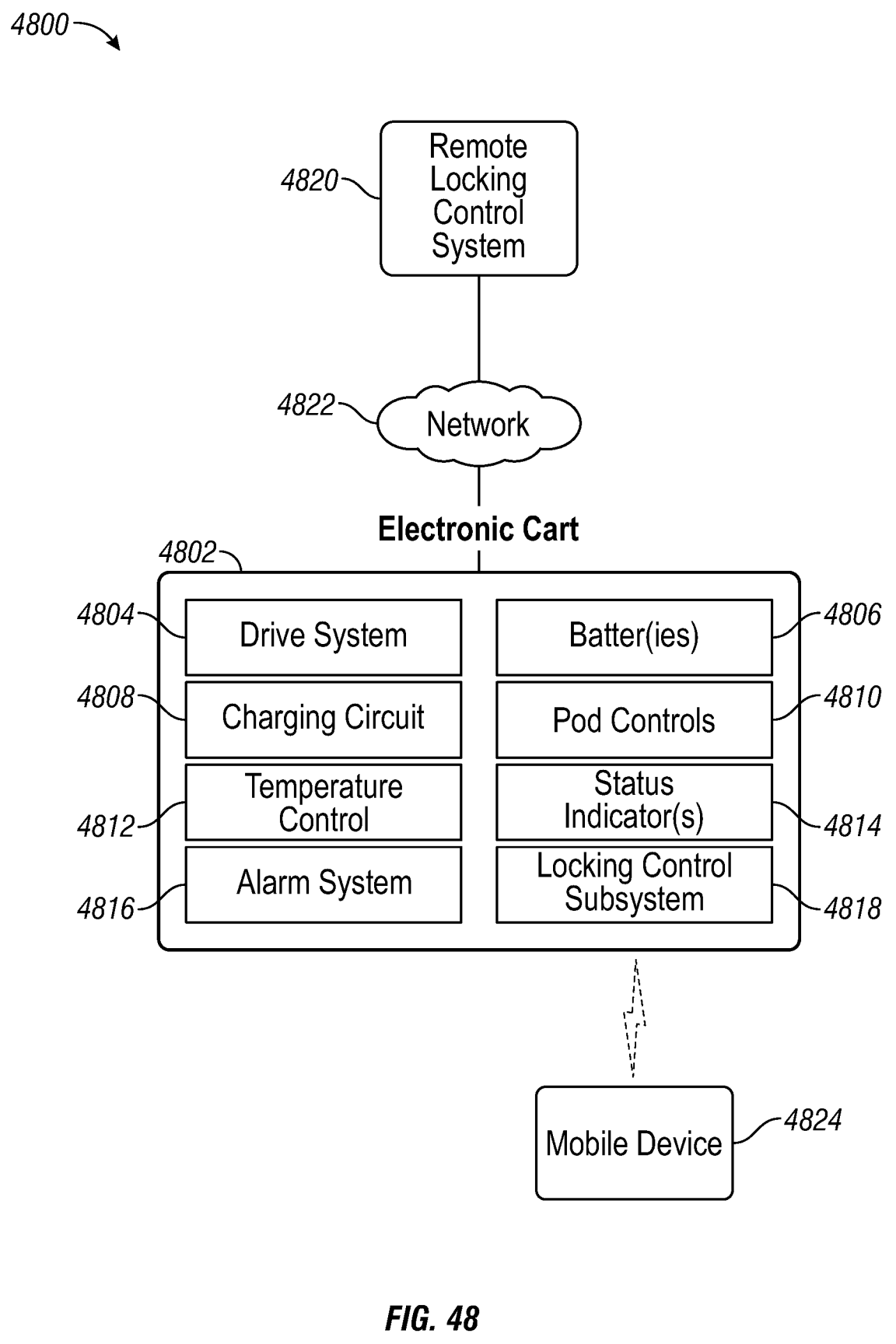

4800

4820 — Remote Locking Control System

4822 — Network

Electronic Cart

4802

4804 — Drive System

4806 — Batter(ies)

4808 — Charging Circuit

4810 — Pod Controls

4812 — Temperature Control

4814 — Status Indicator(s)

4816 — Alarm System

4818 — Locking Control Subsystem

4824 — Mobile Device

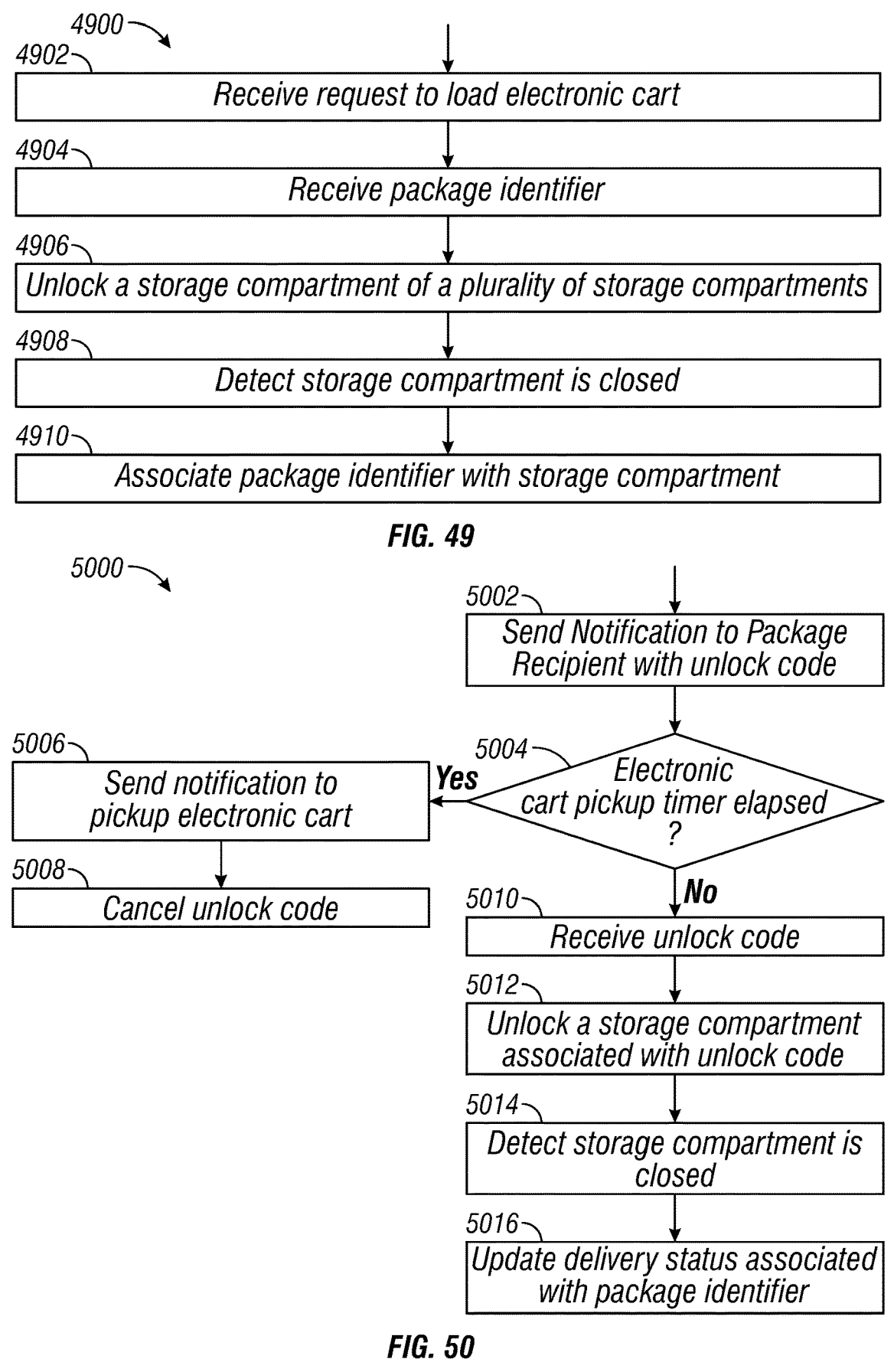

4902
Receive request to load electronic cart

4904
Receive package identifier

4906
Unlock a storage compartment of a plurality of storage compartments

4908
Detect storage compartment is closed

4910
Associate package identifier with storage compartment

5002
Send Notification to Package Recipient with unlock code

5004
Electronic cart pickup timer elapsed?

Yes

5006
Send notification to pickup electronic cart

5008
Cancel unlock code

No

5010
Receive unlock code

5012
Unlock a storage compartment associated with unlock code

5014
Detect storage compartment is closed

5016
Update delivery status associated with package identifier

FIG. 50

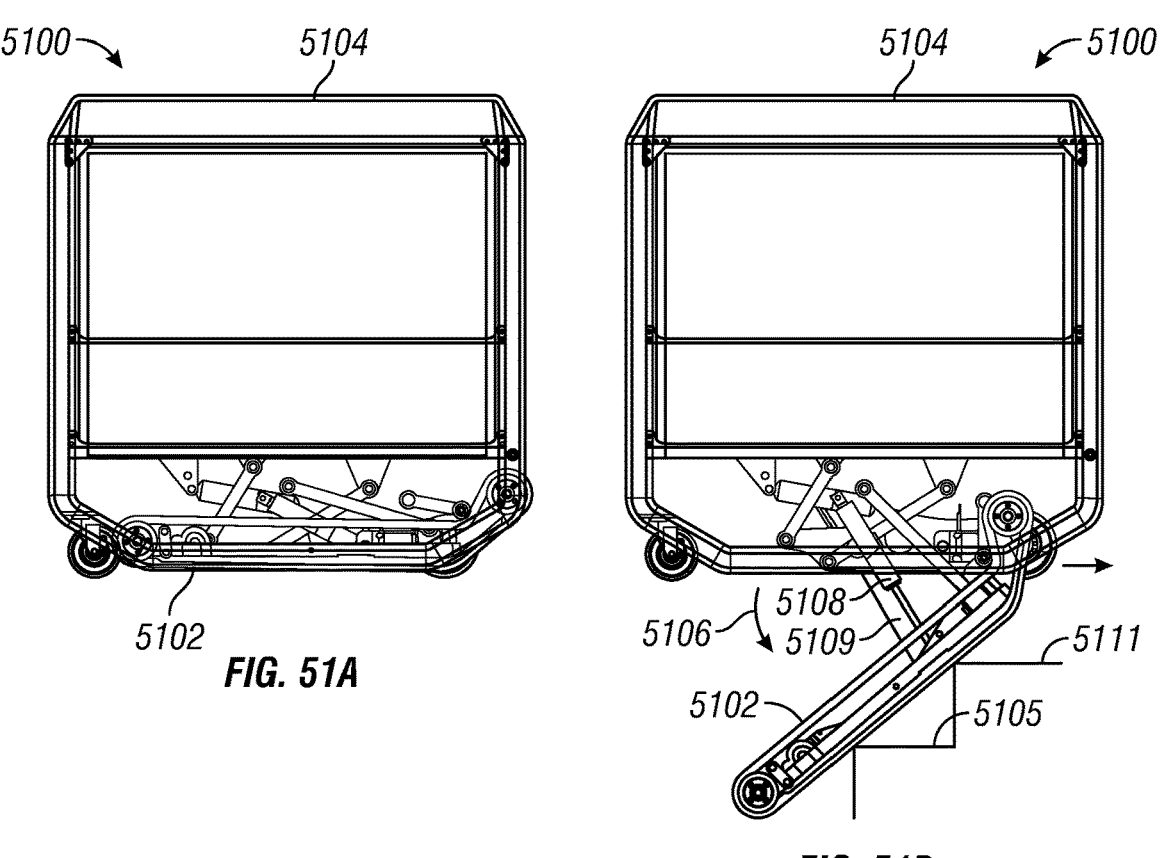
FIG. 51A
FIG. 51B
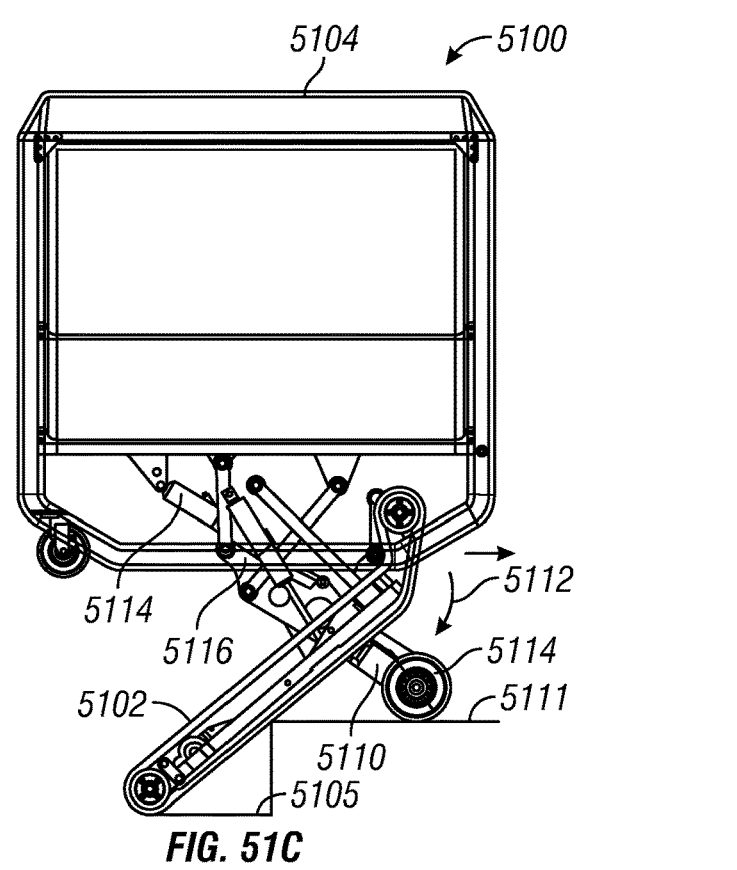
FIG. 51C

CARGO TRANSPORT SYSTEM AND METHOD

RELATED APPLICATIONS

This application claims the benefit of U.S. Provisional Application No. 63/295,965 for an Electronic Cart filed Jan. 3, 2022, U.S. Provisional Application No. 63/248,688 for an Electronic Cart filed Sep. 27, 2021, and U.S. Provisional Application No. 63/244,937 for an Electronic Cart filed Sep. 16, 2021. Each of these applications are hereby incorporated by reference in their entireties.

TECHNICAL FIELD

This disclosure relates generally to a cargo transport system; in particular, this relates to an electronic cart that facilitates package delivery from a delivery vehicle to the cargo's destination.

BACKGROUND

Challenges arise in loading delivery trucks and delivering goods to their ultimate destination. Current delivery methods require the delivery vehicle, such as a delivery truck or cargo van, to park near the destination address; the driver then manually moves the package(s) to the delivery location. The driver typically uses 4-wheel carts, 2-wheel hand carts, and bags to move goods. However, the manual hauling of these packages can be labor intensive and result in potential injuries to the driver over time. There can also be situations that exacerbate this issue when parking is not available near the delivery location (e.g., limited truck parking, no truck access, etc.). When this happens, the driver must park further away and carry the package(s) a longer distance from the vehicle, which can increase delivery times and increase manual efforts of the driver. Additionally, there is no access for the delivery vehicle in inside buildings due to engine fumes.

Therefore, there is a need for improving the way in which goods are loaded to/from delivery vehicles.

SUMMARY

According to one aspect, this disclosure provides an electronic cart with an electronic cart body including one or more internal compartments. The cart includes one or more wheels and/or a track assembly supporting the electronic cart body. One or more batteries are carried by the electronic cart body. The cart has a drive system to drive the one or more wheels and/or the track assembly, wherein the drive system is powered, at least in part, by the one or more batteries. One or more hand-operated cart controls are provided on the cart to adjust a speed with which the drive system drives the one or more wheels and/or the track assembly.

According to another aspect, this disclosure provides an electronic cart for securely holding packages to be delivered at a drop off location. The cart includes an electronic cart body including a plurality of lockable compartments. One or more wheels and/or a track assembly support the electronic cart body. The cart includes one or more batteries carried by the electronic cart body. There is a drive system to drive the one or more wheels and/or the track assembly. The drive system is powered, at least in part, by the one or more batteries. The cart includes a locking control subsystem configured to control unlocking of the plurality of lockable compartments in response to wirelessly receiving unlock codes associated with respective lockable compartments.

According to a still further aspect, this disclosure provides a method to securely hold packages at a drop off location. The method includes the step of providing a portable cart with a plurality of lockable compartments, wherein the portable cart includes a locking control subsystem to: (i) control unlocking of the plurality of lockable compartments in response to wirelessly receiving unlock codes associated with respective lockable compartments and (ii) enter into a package loading mode in which the locking control subsystem is programmable to associate respective unlock codes with the plurality of lockable compartments. The method includes the step of generating an unlock code for each respective package loaded into lockable compartments of the portable cart. A notification is sent to a package recipient with an unlock code associated with the package recipient's package. The method includes receiving a proposed unlock code via a wireless scanner of the portable cart. The method also includes the step of determining whether the proposed unlock code matches an unlock code associated with one or more of the plurality of lockable compartments. In response to the proposed unlock code matching the unlock code associated with one or more of the plurality of lockable compartments, the cart unlocks the one or more lockable compartments that match the proposed unlock code.

According to yet another aspect, this disclosure provides a side-loading delivery vehicle. The vehicle includes a body with a cab portion and a rear portion with a rear storage compartment, wherein the rear storage compartment includes a rear wall, a front wall separating the cab portion and the rear storage compartment, and side walls. There is also at least one side door on at least one of the side walls for accessing the rear storage compartment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 1 is a right side view of an example ride-behind electronic cart in the lowered position hauling a pod according to an embodiment of this disclosure;

FIG. 2 is a right side view of the example ride-behind electronic cart shown in FIG. 1 in the raised position;

FIG. 3 is a simplified block diagram showing various components of an electronic cart according to an embodiment of this disclosure;

FIG. 4 is a front view of the example ride-behind electronic cart shown in FIG. 1 with a door in the open position to reveal a portion of the interior compartment according to an embodiment of this disclosure;

FIG. 5 is a right side view of the example ride-behind electronic cart shown in FIG. 1 with a pod according to another embodiment;

FIG. 6 is a right side view of the example ride-behind electronic cart shown in FIG. 6 in the raised position;

FIG. 7 is a right side view of the example ride-behind electronic cart shown in FIG. 6 with multiple pods being driven in unison according to an embodiment of this disclosure;

FIG. 15 is a right side view of the example side-loading delivery truck shown in FIG. 14 with the side door in the open position;

FIG. 16 is a right side view of the example side-loading delivery truck shown in FIG. 15 with a pod transfer device in an initial position according to an embodiment of this disclosure;

FIG. 22 is a simplified block diagram showing various components of a pod according to an embodiment of this disclosure;

FIG. 34 is a right side perspective view of an example electronic cart according to another embodiment of this disclosure with the wheels engaging the ground;

FIG. 48 is a simplified block diagram showing various components of an electronic cart in a remote locking system according to an embodiment of this disclosure;

FIG. 49 is a simplified flow diagram of at least one embodiment of a method for loading an electronic cart with one or more packages based on a remote locking system for delivery to recipient(s) according to an embodiment of this disclosure;

FIG. 50 is a simplified flow diagram of at least one embodiment of a method for controlling unlocking of one or more compartments of a cart according to an embodiment of this disclosure; and FIGS. 51A-51C are side views of an example cart in a stair climbing mode according to another embodiment of this disclosure.

DETAILED DESCRIPTION OF THE DRAWINGS

Figures 8, 9, 10:
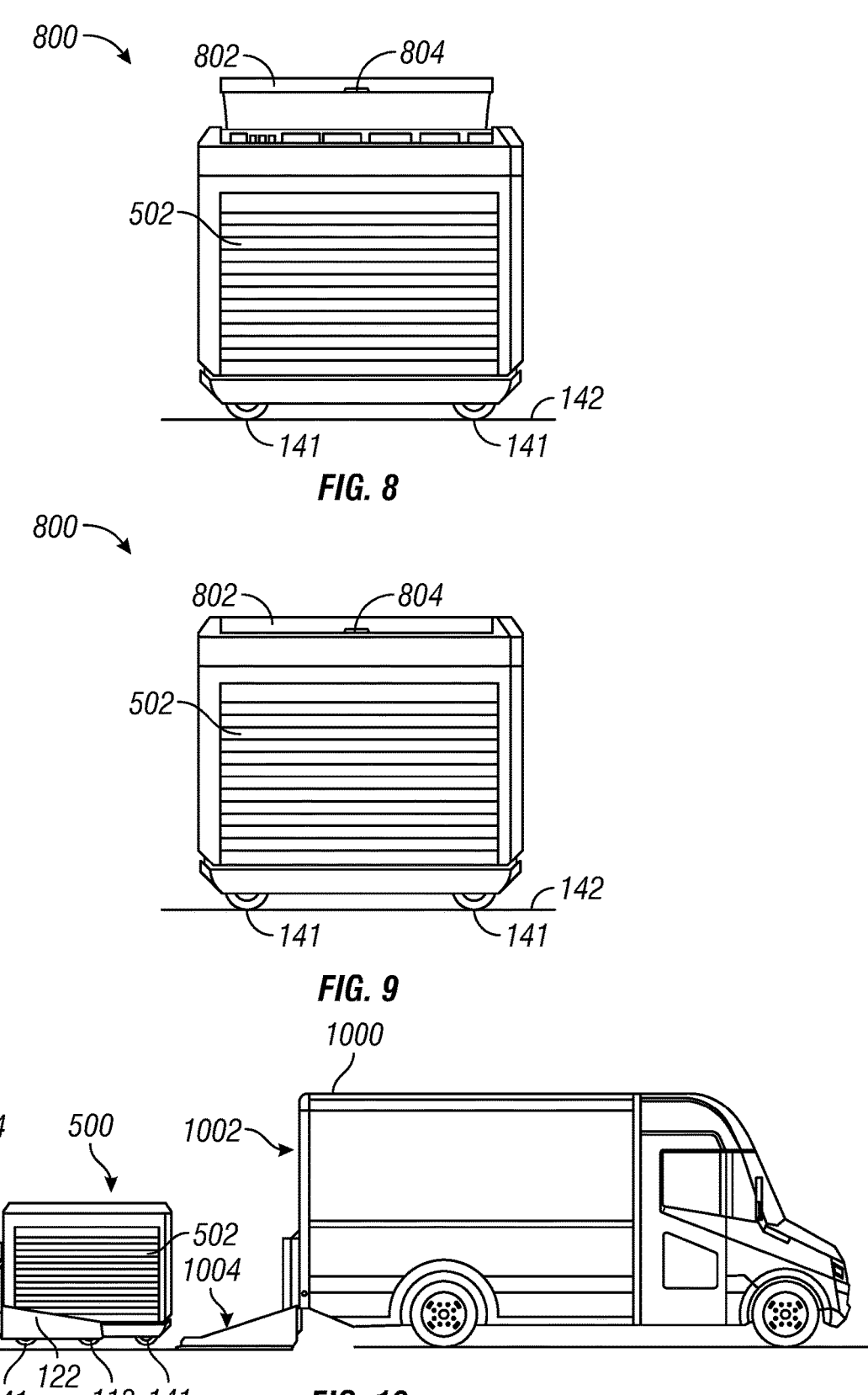
FIGS. 8 and 9 are right side views of an example pod with a top door in the open and closed positions, respectively.
FIG. 10 is a right side view of the example ride-behind electronic cart shown in FIG. 6 adjacent rear loading mechanism of a delivery truck, which is in the lowered position.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

In some embodiments, this disclosure relates generally to an electronic cart 100 and pod 102 that facilitates moving goods between a loading area to a delivery truck, and from a delivery truck to a destination location for delivery. The pod 102 includes one or more doors that can be opened to provide access to one or more interior compartments, which can be loaded with goods. One or more pods may be moved to the delivery truck by the electronic cart 100. In some embodiments, the electronic cart 100 can aid in loading the delivery truck with one or more pods. After the delivery truck reaches the destination area, the electronic cart 100 may be used to move one or more pods loaded onto the delivery truck to the destination location where one or more goods in the interior compartment of the pod(s) can be delivered.

Referring to FIG. 1, there is shown an example electronic cart 100 driving an example pod 102. In the example shown, the electronic cart 100 and pod 102 have a front 104, a rear 106, a left side 108 and a right side 110 (see also FIG. 4). As shown, the rear 106 of the electronic cart 100 includes a stand-behind platform 112 onto which a user 114 may stand during operation of the electronic cart 100. In some embodiments, the electronic cart 100 may be configured as a stand behind unit in which the user walks behind the electronic cart 100 as it moves.

The electronic cart 100 includes cart controls 116 for controlling movement of the electronic cart 100. The cart controls 116 are configured to control speed and/or steering of the electronic cart 100. The cart controls 116 could be embodied as a variety of control knobs, levers, steering wheel, accelerator/brake pedals, etc. For example, depending on the circumstances, the cart controls 116 could have a similar configuration as a forklift. As shown, at least a portion of the cart controls 116 extend from the stand-behind platform 112 so the user may control speed and steering while standing on the platform 112 (or walking behind the cart 100 in stand behind embodiments).

The electronic cart 100 includes wheels 118 that can be used to drive the electronic cart 100. The number of wheels 118 may differ depending on the circumstances. In the example shown, the electronic cart 100 includes left and right rear drive wheels and a centered front wheel (FIG. 4). Of course, the electronic cart 100 could be front wheel drive depending on the circumstances. In some cases, the electronic cart 100 could include four wheels or more; likewise, the electronic cart 100 could have fewer wheels depending on the circumstances. In some cases, the wheels 118 could be large sized to support moving over different terrains, such as grass, gravel, uneven ground, etc.

The electronic cart 100 includes a drive system 120 (FIG. 3), which could include one or more electric motors, for driving one or more drive wheels. In some embodiments, the drive system 120 could be configured to drive the electronic cart 100 up to about 5 miles per hour (MPH). Other speeds may be provided depending on the circumstances. The cart controls 116 may be used to control the drive system 120 to adjust the speed of the electronic cart 100. Likewise, the cart controls 116 may be used to put the motor(s) in reverse so the electronic cart 100 may be driven in both a forward direction and a rearward direction. In some cases, the cart controls 116 may include a reverse alarm, which may provide an audible and/or visual indicator, when the electronic cart 100 is being driven in the rearward direction.

In the embodiment shown, the electronic cart 100 includes a loading platform 122 that may be coupled with a pod 102 to move the pod 102 to a desired position. There are a variety of manners in which the loading platform 122 could be coupled with the pod 122. As shown, the loading platform 122 is movable between a lowered position (FIG. 1) and a raised position (FIG. 2) along a generally vertical axis, which allows the electronic cart 100 to raise/lower the pod 102 for loading into/out of a delivery vehicle. The drive system 120 may be configured to raise and lower the loading platform 122 based on the user's interactions with the cart controls 116.

The electronic cart 100 includes one or more batteries 124 (FIG. 3) for powering the drive system 120 and other electronic components. For example, the batteries 124 could be embodied as a lithium-ion (Li-ion) battery pack; in some cases, the batteries 124 could be removed from the electronic cart 100 for charging. For example, in some cases, the battery pack 124 could be swapped with another battery pack to allow the electronic cart 100 to continue operation while the depleted battery pack is being recharged. Depending on the circumstances, the batteries 124 could be configured to power the electronic cart 100 for approximately 8 hours of operation and have an approximately 6-8 hour charge time. In some cases, the electronic cart 100 could include a charging circuit 126 for charging the batteries 124. In some embodiments, the charging circuit 126 could be integral to the electronic cart 100 and plugged into a power source to recharge the electronic cart 100. In some cases, the charging circuit 126 (FIG. 3) could be external to the electronic cart 100 and the batteries 124 (e.g., battery pack) removed from the electronic cart 100 and connected to the charging circuit 126 for recharging the batteries 124.

In some circumstances, the electronic cart 100 may include a kill switch, which may be embodied as a kill stop cord that stops operation of the electronic cart 100 upon pulling from the electronic cart 100. For example, the electronic cart 100 may include a cord proximate the cart controls 116 within reach of the user 114 during operation that could be pulled to kill power to the drive system 120, thereby stopping movement of the electronic cart 100.

In some embodiments, the pod 102 is shaped as a box with a front wall 128, a rear wall 130, a left side wall 132, a right side wall 134, a bottom wall 136, and a top wall 140. By way of example only, the pod 102 could be 24 inches wide, 48 inches long, and 48 inches high. However, depending on the circumstances, the pod 102 could be a variety of sizes. Likewise, even though the pod 102 is embodied as a box shape in the embodiment shown, other shapes could be provided depending on the circumstances. In some embodiments, the pod 102 may be formed from lightweight aluminum and/or composite materials. As shown, the pod 102 includes wheels 141 on which the pod 102 rides. In some embodiments, the wheels 141 may be extended (as shown in FIG. 1) or retracted within the pod 102. In some circumstances, the pod 102 and/or electronic cart 100 may be equipped with a security system.

FIG. 2 illustrates the electronic cart 100 with the loading platform 122 lifting the pod 102 above a surface 142. For example, the loading platform 122 could be moved to the raised position using cart controls 116 for loading the pod 102 into a delivery vehicle (see FIG. 13).

FIG. 3 illustrates various components of the electronic cart 100. As discussed herein, the electronic cart 100 may be powered by one or more batteries 124, which may be recharged using the charging circuit 126. The drive system 120, which may include one or more motors, for driving wheels 118 and/or raising/lowering loading platform 122 based on the cart controls 116.

Referring to FIG. 4, the example pod 102 includes a front door 144 that moves between an open position (as shown) that provides access to the interior compartment 146 and a closed that prevents access to the interior compartment 146. In the example shown, the front door 144 is embodied as a roller-style door, but could be a swinging door, sliding door, or other style door.

FIGS. 5 and 6 illustrate the electronic cart 100 in a similar position to FIGS. 1 and 2, respectively, but with a pod 500 according to another embodiment. In the embodiment shown, the pod 500 includes one or more side doors 502 that are movable between a closed position (as shown) that prevents access to the interior compartment and an open position that allows access to the interior compartment. Depending on the circumstances, the side doors 502 may be roller-style, sliding doors, swinging doors, etc.

In some embodiments, the electronic cart 100 may be configured to simultaneously move more than one pod 500 at the same time as shown in the example on FIG. 7. Although two pods are shown driven at the same time by the electronic cart for purposes of example in FIG. 7, more pods could be driven at the same time depending on the circumstances. In some cases, the pods may include latching mechanisms, magnetic couplers, etc. to aid in keeping the pods together during transport. For example, the front portion of the pod 500 may have a magnet that is attracted to a magnet on the rear portion of the pod 500 to help keep the pods together while the electronic cart 100 transports more than one pod at a time.

FIGS. 8 and 9 illustrate a pod 800 according to another embodiment. This embodiment is similar to the pod 500, but includes a top door 802 that is movable from an open position (FIG. 8) and a closed position (FIG. 9). In the example shown, the top door 802 is hinged to the top portion of the pod 800 and pivots between the open/closed positions. In some cases, the top door 802 includes a recessed area 804 to aid in lifting open the top door 802. In the embodiment shown, the pod 500 is shorter than the pod 500. As discussed herein, embodiments of the pod could come in a variety of different sizes and shapes.

Figure 11:
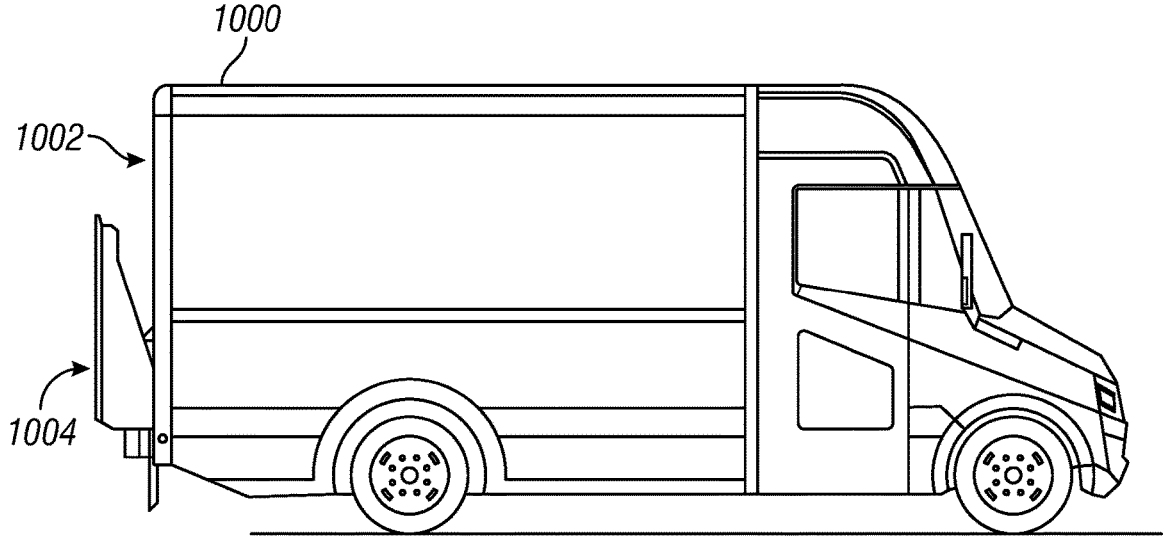
FIG. 11 is a right side view of an example delivery truck with a rear loading mechanism in a raised position.
Figure 12:
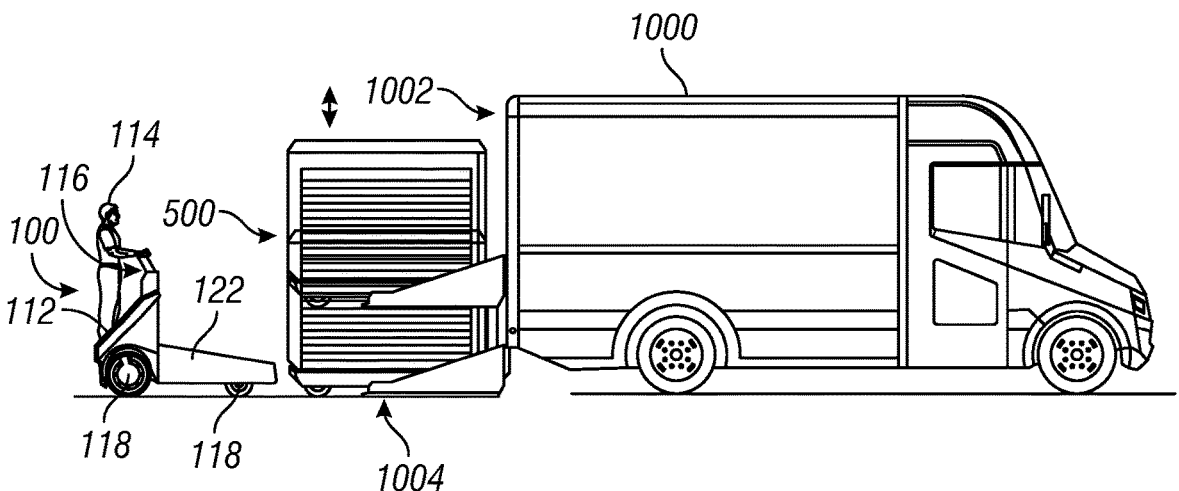
FIG. 12 is a right side view of an example delivery truck showing progressive unloading of a pod adjacent the example ride-behind electronic cart shown in FIG. 6.
Figure 13:
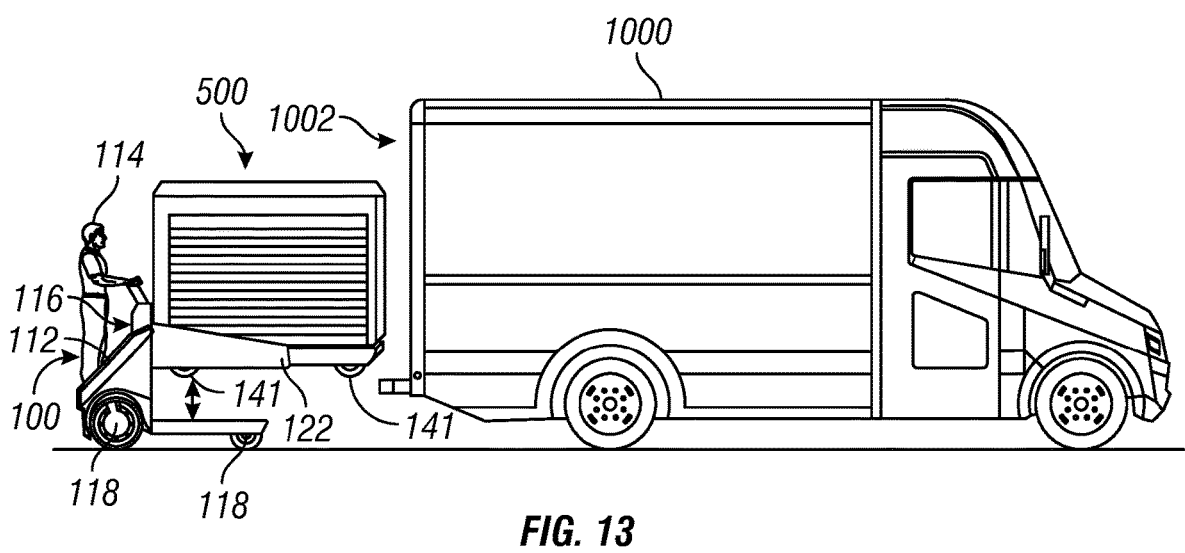
FIG. 13 is a right side view of the example ride-behind electronic cart shown in FIG. 6 in the raised position to load an example delivery truck.

FIG. 10-13 illustrates operation of the electronic cart 100 and pod 800 to load and unload the pod 500 to/from a delivery vehicle 1000. In this example, the delivery vehicle 1000 includes a rear entry 1002 to load/unload cargo within the rear storage area. The delivery vehicle 1000 shown in FIGS. 10-13 includes a cargo transfer system 1004 to aid in loading/unloading the pod 500 from the rear of the delivery vehicle 1000. The electronic cart 100 can be used to maneuver the pod 500 towards the cargo transfer system 1004, which has been moved to a lowered position, as shown in FIG. 10. The electronic cart 100 can move the pod 500 onto the cargo transfer system 1004 for moving within the rear storage compartment of the delivery vehicle 1000. As shown in FIG. 11, the cargo transfer system 1004 has been moved to a transport position. FIG. 12 illustrates an example in which the cargo transfer system 1004 is able to move along a vertical axis to lift a pod up to the height of the rear storage compartment's floor so the pod can be moved into the storage compartment. Conversely, during unloading of pods, the cargo transfer system 1004 may be used to lower the pod 500 from the height of the rear storage compartment's floor to the ground. FIG. 13 illustrates an example in which the delivery vehicle 1000 does not include a cargo transfer system 1004. Instead, the electronic cart's 100 loading platform 122 may be raised to the height of the rear storage compartment's floor for loading/unloading the pod 500.

Figure 14:
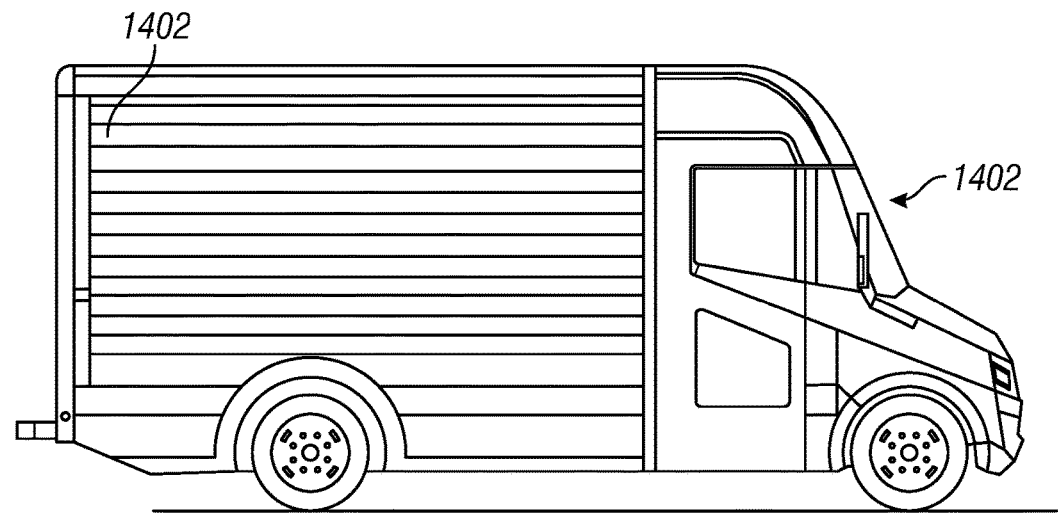
FIG. 14 is a right side of an example side-loading delivery truck with the side door in the closed position according to an embodiment of this disclosure.

FIGS. 14-17 illustrate an example side-loading delivery vehicle 1400. In the example shown, the side-loading delivery vehicle 1400 includes one or more side door(s) 1402 that can be opened for accessing the rear storage compartment 1404 (FIGS. 15-17) and the door(s) 1402 closed during transport (FIG. 14). Depending on the circumstances, the side-loading delivery vehicle 1400 may include side door(s) 1402 on both the left and right sides, on the left side only, or on the right side only. In the example shown, the door(s) 1402 are roller-style doors that are configured to roll up to an open position in which the door slides upward near the top wall of the interior storage compartment 1404. However, depending on the circumstances, there may be embodiments of the side-loading delivery vehicle 1400 in which the door(s) 1402 may be sliding or swinging style doors.

Figure 17:
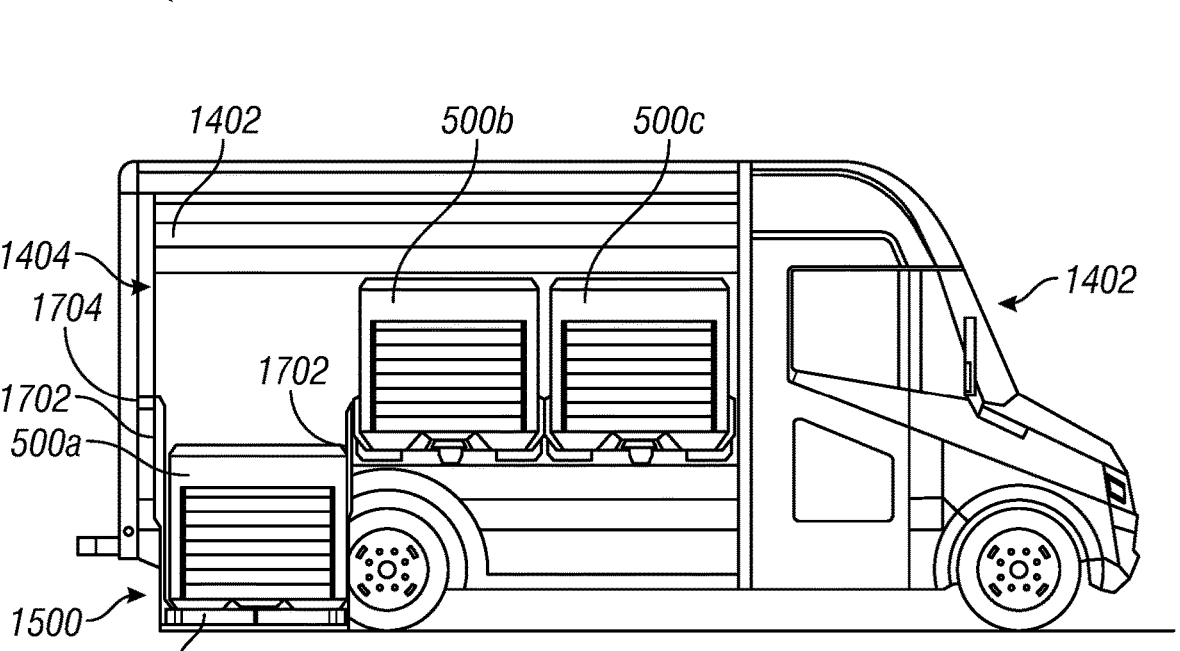
FIG. 17 is a right side view of the example side-loading delivery truck shown in FIG. 16 with a pod transfer device in an unloaded position according to an embodiment of this disclosure.

Referring now to FIGS. 15-17, in which at least one of the door(s) 1402 is in the open position, this example shows three pods 500a, 500b, 500c loaded within the rear storage compartment 1404. Although three pods 500a, 500b, 500c are shown for purposes of example, more or less pods could be stored in the rear storage compartment 1404 depending on the size of the rear storage compartment and/or the size of pods. Since the delivery vehicle 1400 can be side-loaded and unloaded, there is access to any of the pods 500a, 500b, 500c for unloading. Accordingly, the delivery driver can select to unload any of the pods, which speeds delivery time. Consider an example in which the cargo to be unloaded is in the rear-most pod 500c. In a delivery vehicle that only has a rear door, the other two pods 500a, 500b would need to be unloaded to access the rear-most pod 500c; in contrast, the delivery vehicle 1400 provides side-loading and allows the rear-most pod 500c to be accessed directly without removing the other pods 500a, 500b from the rear storage compartment 1404.

In some embodiments, there is an integrated cargo transfer system 1500 within the rear storage compartment 1404 that is configured to move one or more pods from the stored position (FIGS. 15-16) to an unloaded position (FIG. 17). Depending on the circumstances, there could be separate cargo transfer devices for each pod in the rear storage compartment 1404. The delivery vehicle 1400 may include integrated controls for controlling movement of the cargo transfer system 1500 between stored/unloaded positions inside the rear storage compartment or elsewhere on the delivery vehicle 1400, such as within the cab portion 1404. For example, there could be one or more buttons, knobs or levers on the dash within the cab portion 1404 for opening the side door(s) 1402 and/or initiating unloading of a selected pod by the cargo transfer system 1500. By way of example, the driver could park nearby a delivery address and, from the cab portion 1404. select button(s) for opening one of the side door(s) 1402 and initiate unloading of the pod with the cargo for delivery. Once the driver exits the delivery vehicle 1400, the pod may already be on the ground ready to be transported to the delivery location using the electronic cart 100, which reduces delivery times. In some cases, the control for the cargo transfer system 1500 could be on a keyfob associated with the delivery vehicle 1400. FIG. 16 illustrates the cargo transfer system 1500 initially unloading the pod 500a from the delivery vehicle 1400. FIG. 17 illustrates the cargo transfer system 1500 lowering the pod 500a to the ground. In the example, the cargo transfer system 1500 includes a platform 1700 on which the pod 500a is supported and arms 1702 extending into the rear storage compartment 1404. During unloading/loading, the cargo transfer system 1500 supports the pod 500a in a cantilevered position. In this example, there is a slot 1704 formed in the delivery vehicle through which a portion of the cargo transfer system 1500 extends.

Figures 18, 19:
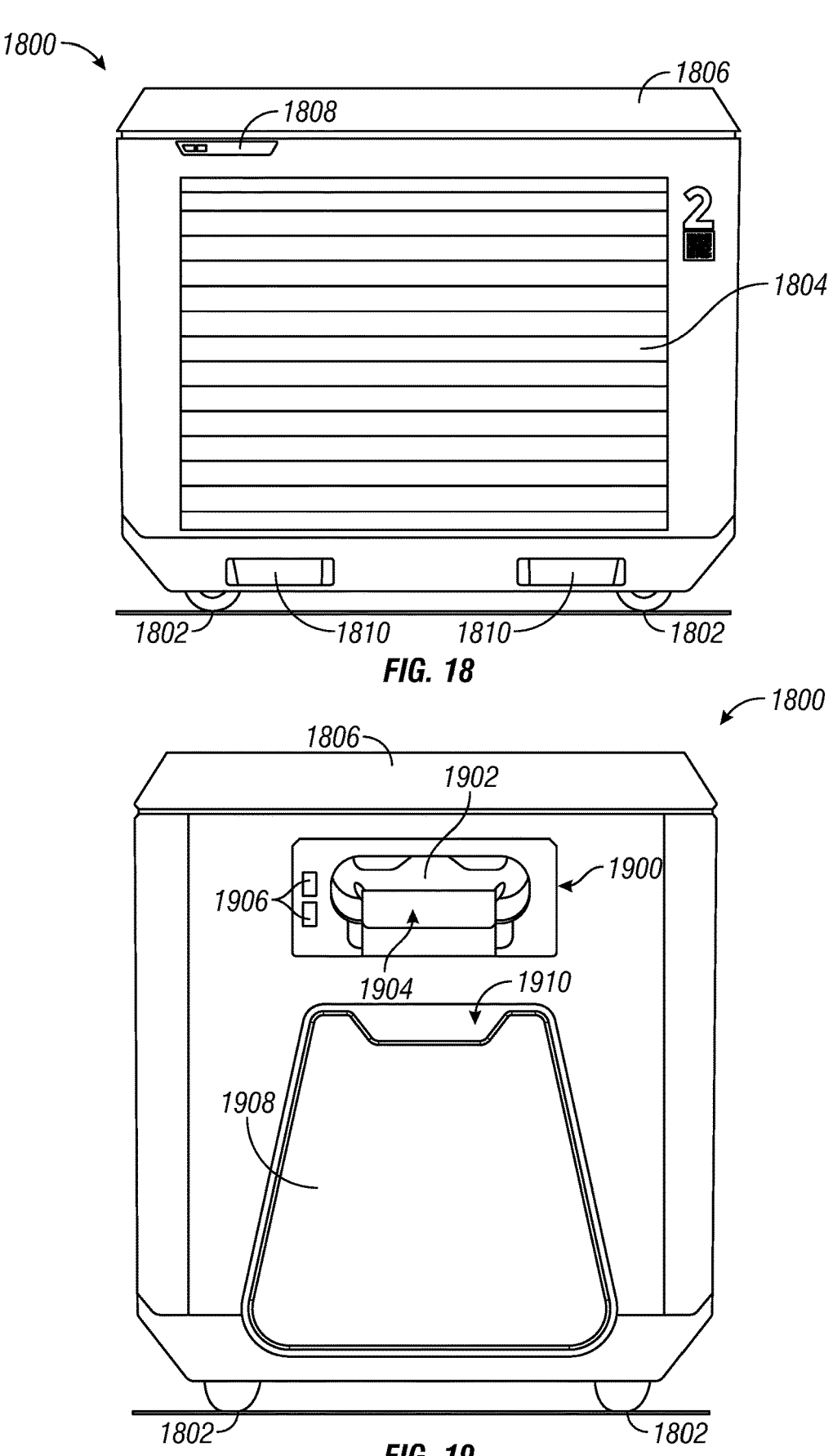
FIG. 18 is a right side view of an example pod according to another embodiment.
FIG. 19 is a rear view of the example pod shown in FIG. 18.

FIG. 18 illustrates an embodiment of an electronic cart 1800. In some embodiments, the electronic cart 1800 may integrate some or all functionality of the pod 102 described herein instead of having a separate cart and pod. In some embodiments, the cart 1800 includes an integrated drive system 2200 (FIG. 22) that drives one or more of the cart's 1800 wheels 1802. Thus, in some embodiments, the electronic cart 1800 with integral pod may move goods between a delivery truck/van and a destination address using the integral drive system 2200. For example, the drive system 2200 of the cart 1800 may include a motor for driving one or more wheels 1802 that is powered by one or more on-board batteries 2202 (FIG. 22).

In the embodiment shown, the cart 1800 includes one or more doors that can be opened to provide access to one or more interior compartments, which can be loaded with goods. For example, the cart 1800 may be configured with one or more side doors 1804 and one or more top doors 1806 that are movable between open and closed positions to access internal compartments of the cart 1800. The doors 1804, 1806 may be swinging, sliding, and/or rolling depending on the circumstances.

In some embodiments, the cart 1800 may include one or more status indicators to provide convenient visibility to status of various components, such as internal temperature internal compartments of the cart 1800, alarm system activated status, locked/unlocked status, compartment empty/full status, battery empty/full status, etc. For example, a status indicator for compartment empty/full status may be green when the cart 1800 is empty, yellow when partially full, and red when completely full. In some cases, the status indicator for temperature could be blue when cooling below ambient temperature, and red when heating above ambient temperature. Depending on the circumstances, a status indicator for the locked/unlocked status could be red when locked and green when unlocked. There are a multiplicity of possibilities for indicating status of various components. In some embodiments, there is a status indicator light 1808 showing locked/unlocked status; similarly, there are status indicators 1810 showing status of full/empty of the cart 1800.

Referring to FIG. 19, the example cart 1800 includes cart controls 1900, which in the embodiment shown includes a handle 1902 extending from a recessed area 1904. For example, the handle 1902 could be configured to control speed and/or forward/reverse movement of the drive system 2200 and/or steer the cart 1800. In the example shown, the cart recessed area 1904 includes one or more buttons 1906 that may be used to control the drive system 2200, such as on/off and/or forward/reverse.

Figures 20, 21:
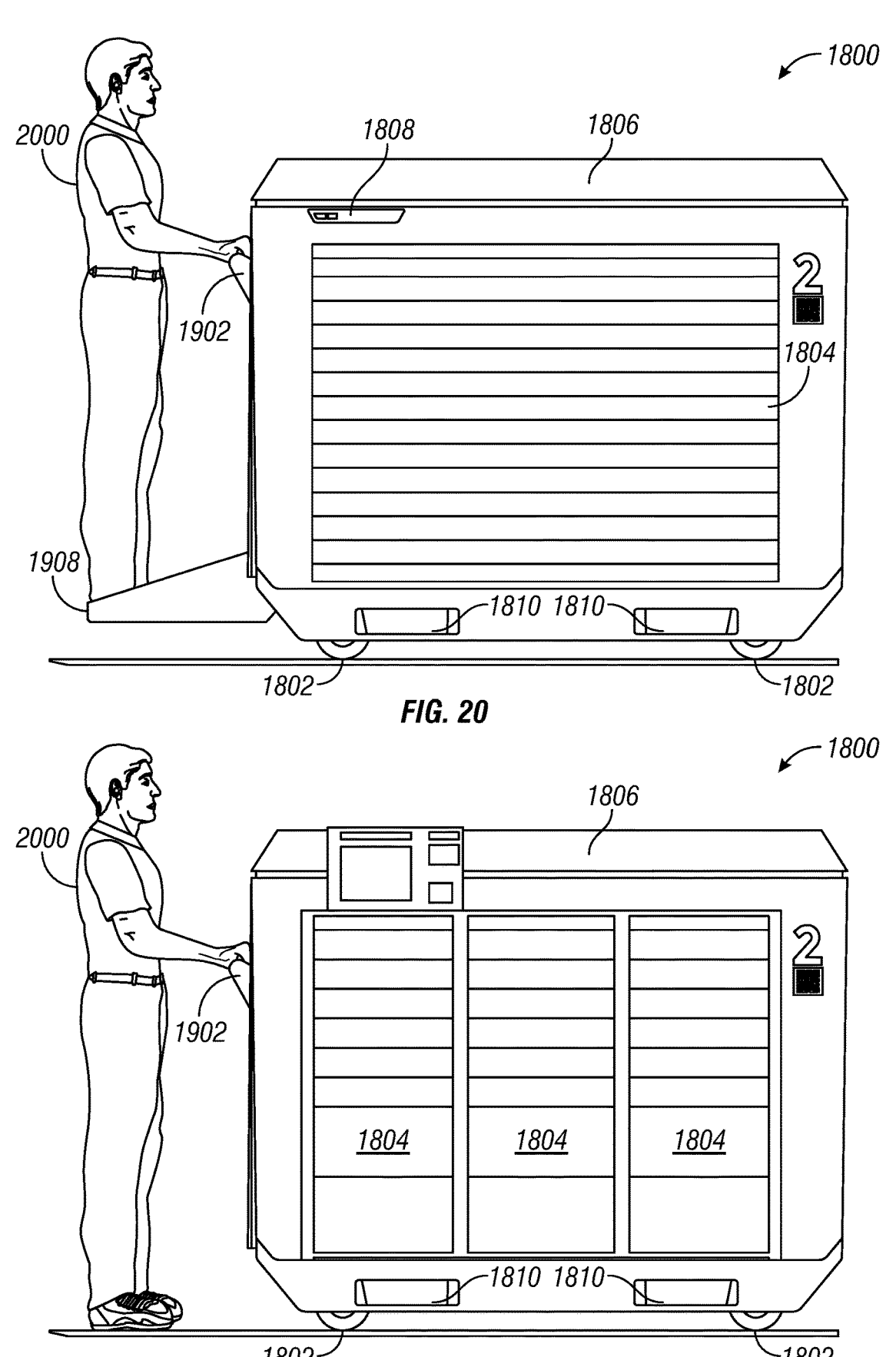
FIG. 20 is a right side view of the example pod shown in FIG. 18 in a ride-behind configuration.
FIG. 21 is a right side view of a pod according to another embodiment in a stand-behind configuration.

As shown, the cart 1800 includes a retractable platform 1908 that is movable between a retracted position (as shown in FIG. 19) and an extended position (as shown in FIG. 20) that allows a user to stand on the platform 1908 and ride behind the cart 1800. In some cases, the platform 1908 is hinged with the cart 1800 and pivots between the retracted position and the extended position. The hinge (not shown) and platform 1908 together are configured to support the weight of the user 2000 in the extended position (see FIG. 20). In the example shown, the platform 1908 includes a cutout-portion 1910 that is dimensioned to allow a user's fingers to manually pull out the platform 1908 to move the platform to the extended position. In some embodiments, the platform 1908 could be automatically moved between extended and retracted positions, such as using the cart controls 1900. As shown, there is a recessed area with a shape corresponding to the platform 1908 that allows the platform 1908 to be flush with the rear wall of the cart 1800 in the retracted position shown in FIG. 19.

FIG. 20 shows the example cart 1800 with the platform 1908 in an extended position, which allows a user 2000 to ride on the platform 1908 while the cart 1800 is driven by the drive system 2200. This could be helpful for moving goods extended distances instead of requiring the user 2000 to walk. FIG. 21 shows the cart 1800 with the platform 1908 in the retracted position. In this position, the user 2000 may walk behind the cart 1800 as it is driven forward by the drive system 2200. In the example shown, the cart 1800 may include a dock for holding a tablet or other computing device of the user 2000. Depending on the circumstances, the cart 1800 may include a wired or wireless subsystem for communicating status information to the computing device of the user 2000. For example, an alarm system and/or lock/unlock functionality of at least a portion of doors 1804, 1806 could be viewed and/or activated with the user's computing device. In some cases, one or more of the status indicators could be wirelessly communicated to the user's computing device and viewed within a reference wireless communication range from the cart 1800. In the embodiment shown, there are three side doors 1804 that provide access to separate compartments. Although three side doors are shown in FIG. 21, and a single side door is shown in FIGS. 18-20, more of less side doors could be provided depending on the circumstances. There are numerous compartment/door configuration options available.

FIG. 22 illustrates various components of the cart 1800 according to an embodiment. As discussed herein, the cart 1800 includes a drive system 2200 that may be powered by one or more batteries 2202, which may be recharged using the charging circuit 2204. The drive system 2200, which may include one or more motors, for driving wheels 1802 is controlled based on the cart controls 2206. The cart controls 2206 are configured to control speed and/or steering of the cart 1800. The cart controls 2206 could be embodied as a variety of control knobs, levers, steering wheel, accelerator/brake pedals, etc. In some embodiments, the cart 1800 may include temperature controls 2208 to provide climate control for one or more compartments of the cart 1800. Embodiments are contemplated in which one or more sensors are provided to detect storage levels within compartments. For example, the sensor(s) may detect whether the compartment(s) are empty, partially filled, and/or completely full. As discussed herein, the cart 1800 may include one or more status indicators 2210. Depending on the circumstances, the cart 1800 could include an alarm system 2212 that could include flashing lights/sounds if one or more doors are opened when the alarm system 2212 is activated. In some cases, the status indicator lights may indicate that the cart 1800 is being driven in the reverse direction, such as with a flashing light and/or audible warning.

Figure 23:
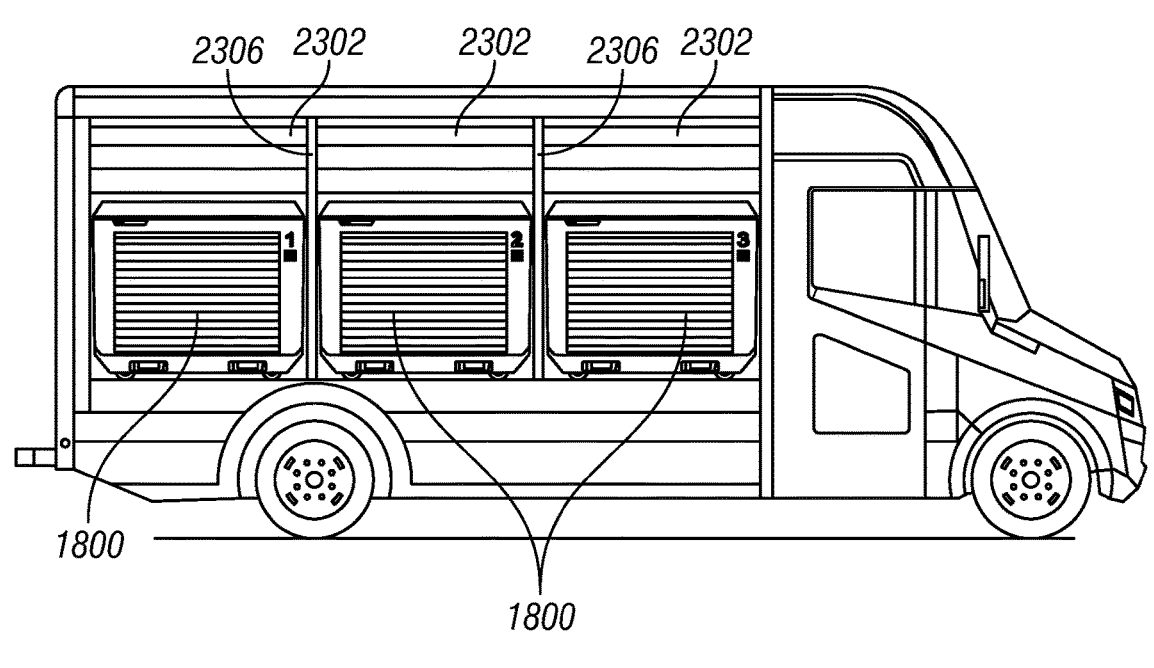
FIG. 23 is a right side of an example side-loading delivery truck with the side doors in the open position showing the truck loaded with a plurality of pods according to an embodiment of this disclosure.
Figure 24:
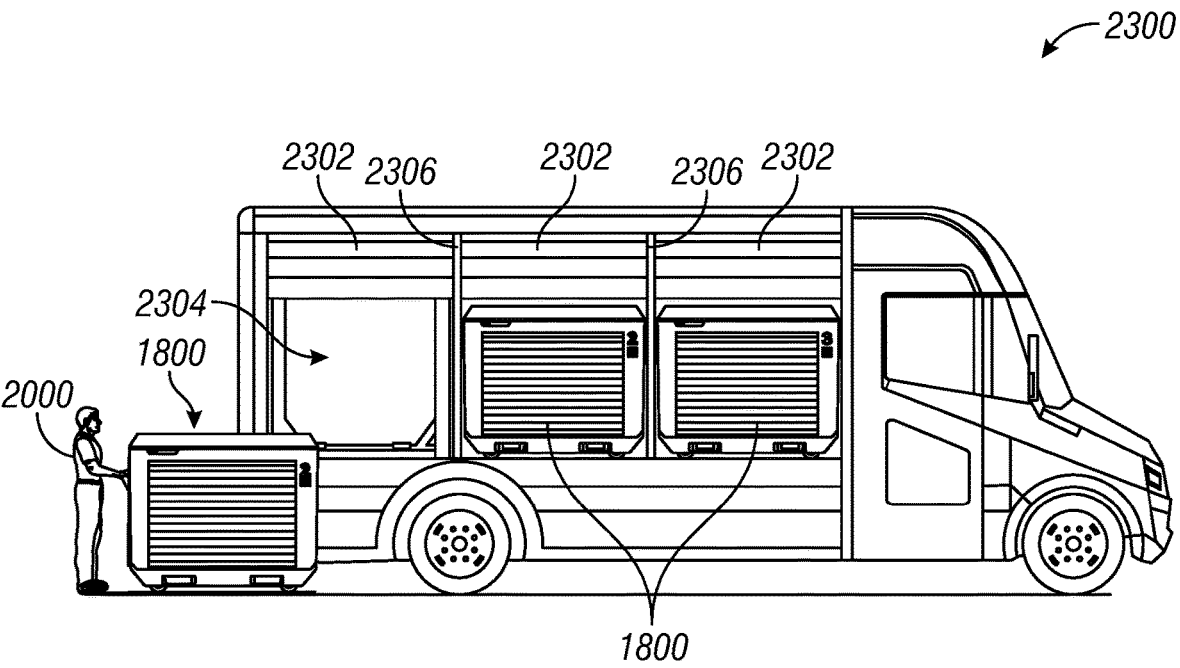
FIG. 24 is a right side of the example side-loading delivery truck shown in FIG. 23 with two pods loaded and another pod to be loaded according to an embodiment of this disclosure.
Figure 25:
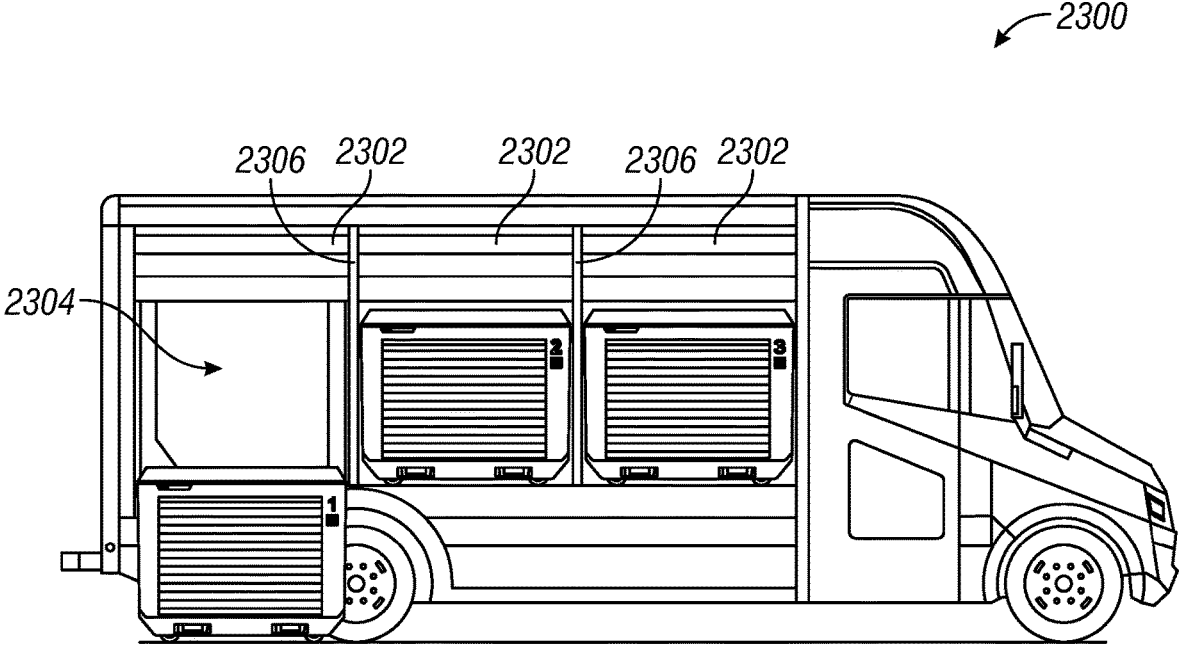
FIG. 25 is a right side of the example side-loading delivery truck shown in FIG. 23 with two pods loaded and another pod unloaded according to an embodiment of this disclosure.

FIGS. 23-25 illustrate an example side-loading delivery vehicle 2300 similar to that shown in FIGS. 14-17. In the example shown, the side-loading delivery vehicle 2300 includes one or more side door(s) 2302 that can be opened for accessing the rear storage 2304 and the door(s) 2302 are closed during transport. In the example shown, there are three doors 2302 shown for purposes of example to access three compartments of the rear storage 2304 that are separated by walls 2306, but more or less doors 2302 and separate compartments could be provided depending on the circumstances. In some embodiments, the side-loading delivery vehicle 2300 may include side door(s) 2302 on both the left and right sides, on the left side only, or on the right side only. In the example shown, the door(s) 2302 are roller-style doors that are configured to roll up to an open position in which the door slides upward near the top wall of the rear storage 2304. However, depending on the circumstances, there may be embodiments of the side-loading delivery vehicle 2300 in which the door(s) 2302 may be sliding or swinging style doors. As shown, multiple carts 1800 may be loaded into the vehicle 2300. As discussed herein, the side-loading delivery vehicle 2300 may include an integral transfer system for moving one or more carts 1800 in the rear storage 2304 in/out.

Figures 26, 27:
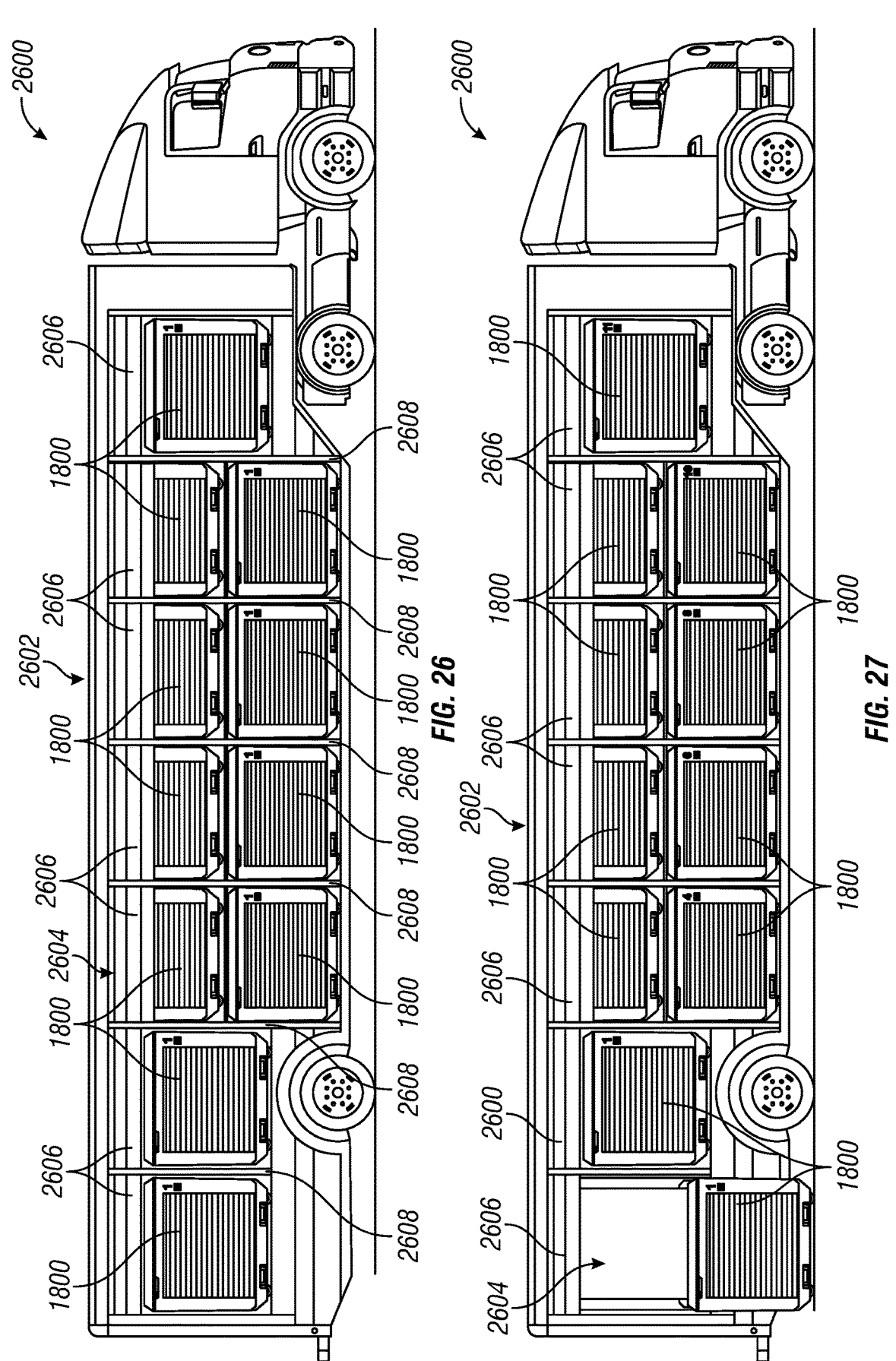
FIG. 26 is a right side of a semi-truck with an example side-loading trailer loaded with a plurality of pods according to an embodiment of this disclosure.
FIG. 27 is a right side of the example side-loading trailer shown in FIG. 26 loaded with a plurality of pods and one of the carts unloaded according to an embodiment of this disclosure.

FIGS. 26-27 illustrate an example semi-truck 2600 with a side-loading trailer 2602 with a trailer storage 2604 for holding a plurality of carts 1800. In the example shown, the side-loading trailer 2602 includes one or more side door(s) 2606 that can be opened for accessing the trailer storage 2604 and the door(s) 2606 are closed during transport. As shown, the trailer storage 2604 is separated into a plurality of compartments with walls 2608. In the embodiment shown, some compartments have a height to accommodate a single cart 1800 and others have a height sufficient to accommodate two carts stacked on top of each other. The exact size and height of the trailer 2602 could be configured to the number of carts 1800 desired to be transported. Depending on the circumstances, the side-loading trailer

2602 may include side door(s) 2606 on both the left and right sides, on the left side only, or on the right side only. In the example shown, the door(s) 2606 are roller-style doors that are configured to roll up to an open position in which the door(s) 2606 slides upward near the top wall of the trailer storage 2604. However, depending on the circumstances, there may be embodiments of the side-loading trailer 2602 in which the door(s) 2606 may be sliding or swinging style doors. As shown, multiple carts 1800 may be loaded into the side-loading trailer 2602. In some cases, as shown, carts 1800 may be stacked on top of each other.

In some embodiments, the trailer 2602 includes an integrated cargo transfer system within the trailer storage 2604 that is configured to move one or more carts from the stored position (FIG. 26) to an unloaded position (FIG. 27). Depending on the circumstances, there could be separate cargo transfer devices for each compartment of the trailer storage 2604. The trailer 2602 and/or semi-truck 2600 may include controls for controlling movement of the cargo transfer system between stored/unloaded positions inside the trailer storage 2604. For example, there could be one or more buttons, knobs or levers on the trailer and/or on the dash within the cab portion of the semi-truck 2600 for opening the side door(s) 2606 and/or initiating unloading of a selected cart by the cargo transfer system. By way of example, the driver could park nearby a delivery address and, from the cab portion of the semi-truck 2600, before getting out, select button(s) for opening one of the side door(s) 2606 and initiate unloading of the cart with the cargo for delivery. Once the driver exits the semi-truck 2600, the cart 1800 may already be on the ground ready to be transported to the delivery location, which reduces delivery times. In some cases, the control for the cargo transfer system could be on a keyfob associated with the semi-truck 2600 and/or a computing device of the user 2000.

Figure 28:
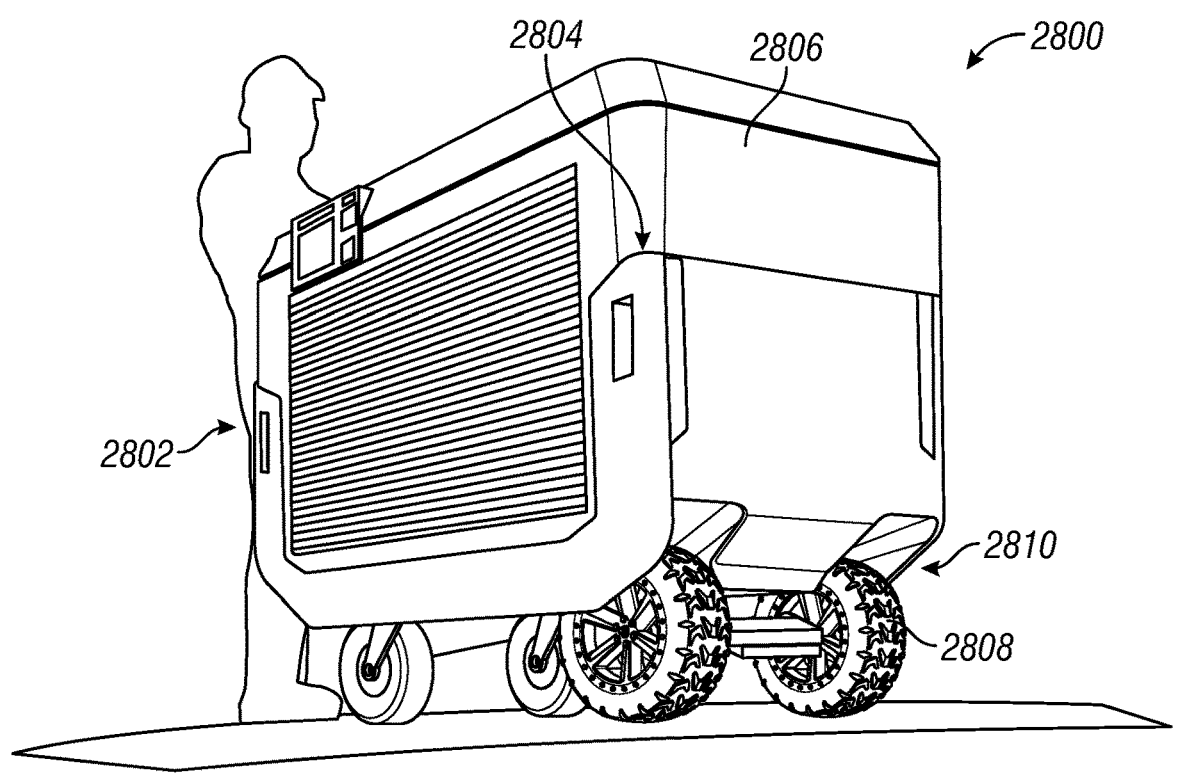
FIG. 28 is a right side perspective view of an example electronic cart according to another embodiment of this disclosure.
Figure 29:
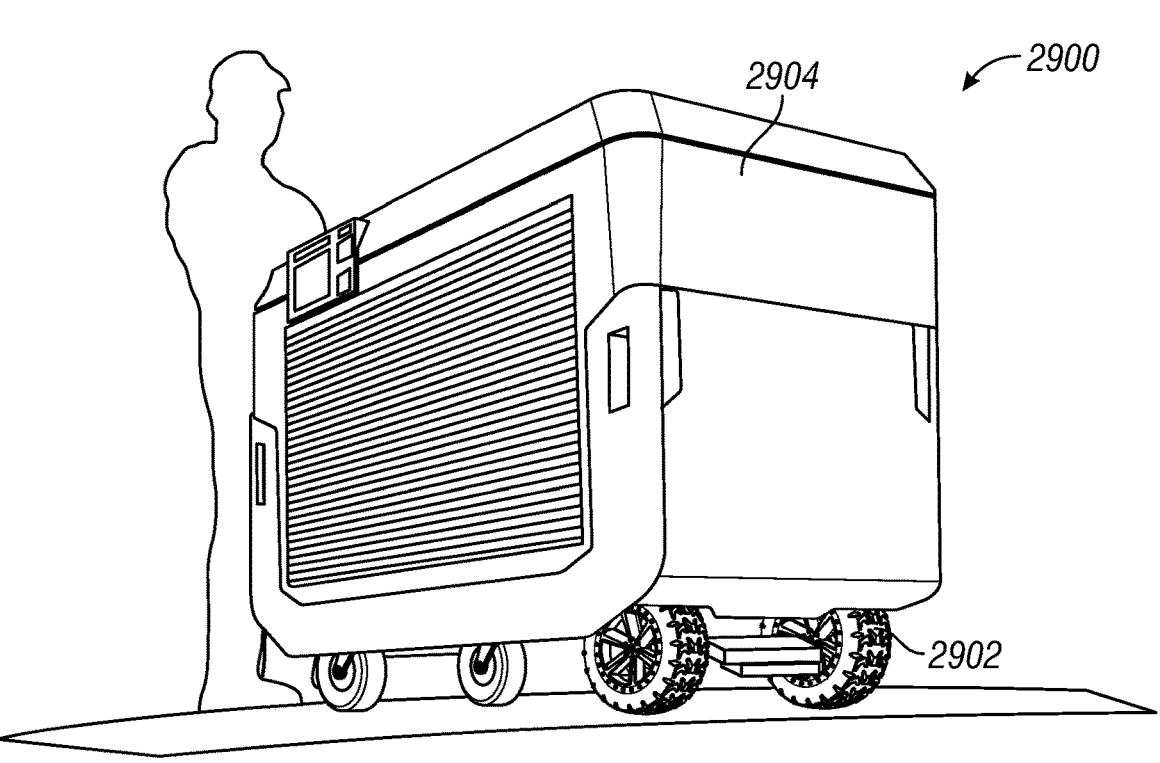
FIG. 29 is a right side perspective view of an example electronic cart according to a further embodiment of this disclosure.

FIG. 28 illustrates an example electronic cart 2800 with a plurality of compartments according to another embodiment of this disclosure. This cart 2800 may include one or more of the components and/or functions described herein with respect to other embodiments. As shown, the cart 2800 includes a first opening 2802 and a second opening 2804 that extend laterally through the body 2806 of the cart 2806. The openings 2802, 2804 may be configured to receive arms from a fork lift or other transport devices to load/unload the cart 2800 into a transport truck or trailer. In the example shown, the body 2806 has heightened ground clearance to traverse over rough terrain. In some cases, for example, the cart 2800 may include off-road style tires 2808. As shown, the body 2806 includes a leading end that has a recessed portion 2810 for further clearance (and/or receiving a track system as discussed herein). FIG. 29 illustrates an example electronic cart 2900 according to another embodiment of this disclosure. This cart 2900 is similar to cart 2800, but includes lower profile tires 2902 and a body 2904 without the leading recessed portion.

FIGS. 30-33 illustrate an example electronic cart 3000 with a track system for traversing rough and/or uneven terrain according to a further embodiment of this disclosure. This cart 3000 may include one or more of the components and/or functions described herein with respect to other embodiments. In the example shown, the electronic cart 3000 includes a drive system with a track assembly 3002. Although the track assembly 3002 includes a first track 3004 and a second track 3006 for purposes of example, one track or more than two tracks could be provided depending on the circumstances. In some cases, the tracks 3004, 3006 may be independently controlled to rotate, as needed, to maneuver to a destination location. For example, the first track 3004 could be rotated faster than the second track 3006 to turn towards the left; likewise, the second track 3006 could be rotated faster than the first track 3004 to turn towards the right. The tracks 3004, 3006 rotate in both forward and reverse directions.

Figure 30:
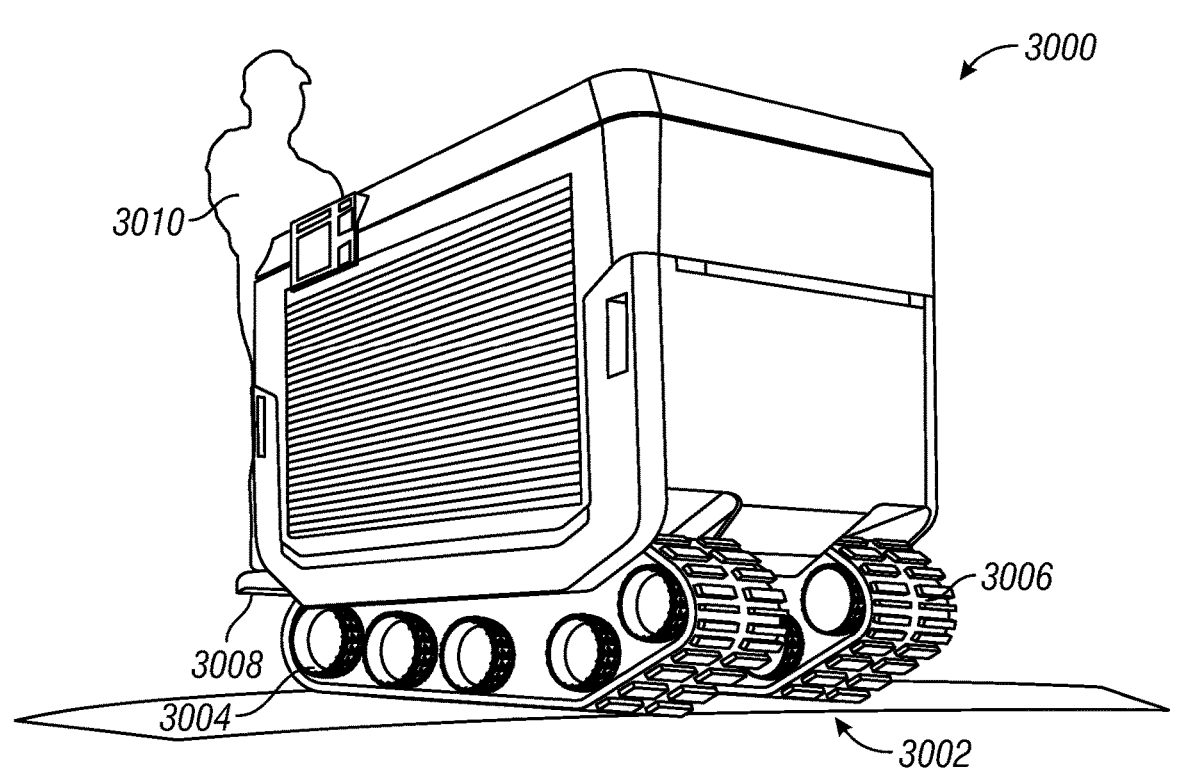
FIG. 30 is a right side perspective view of an example electronic cart according to a another embodiment of this disclosure.
Figure 31:
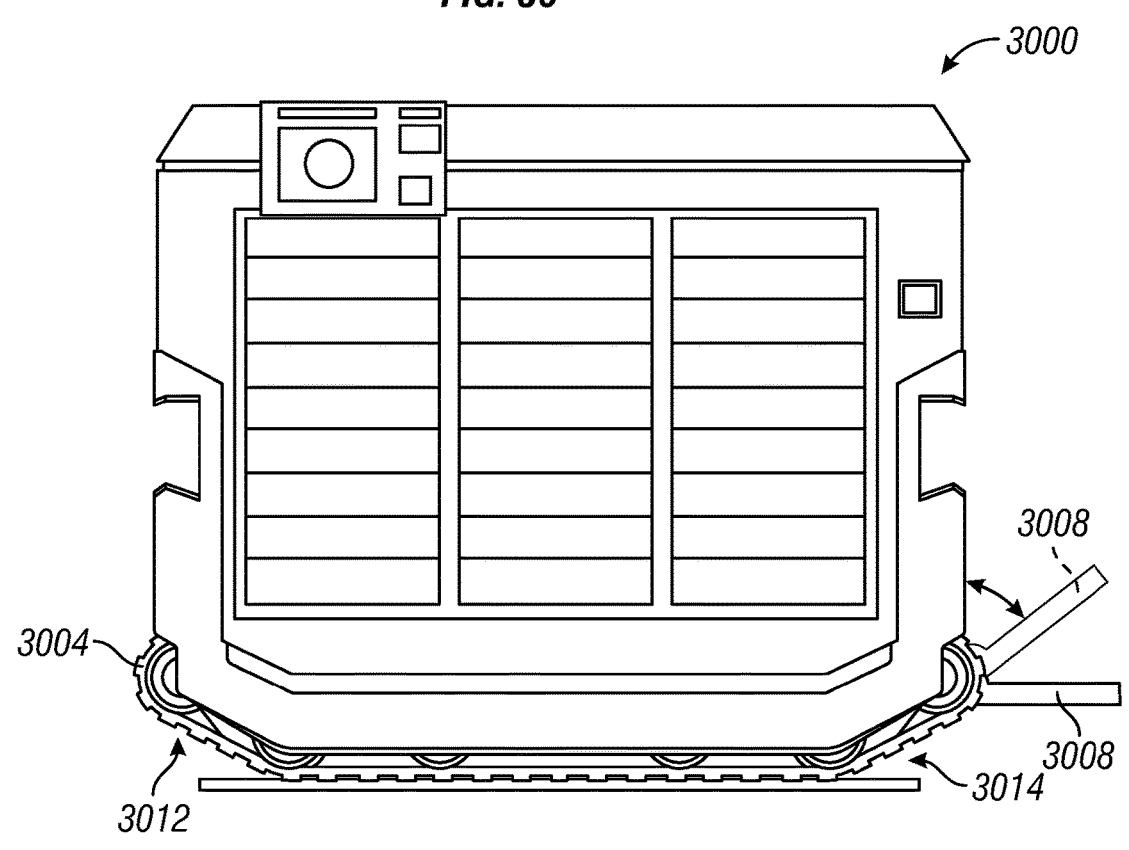
FIG. 31 is a right side perspective view of an example electronic cart according to another embodiment of this disclosure.

In the example shown, the cart 3000 includes a stand-behind platform 3008 that is configured to support a user 3010 during operation (see FIG. 30). As shown, the stand-behind platform 3008 is movable between a retracted position in which the platform 3008 is retracted against or within the cart 3000 and an extended position in which the stand-behind platform 3008 extends away from the cart 3000, which as in an approximately transverse direction. For example, the platform 3008 may pivot or slide between the retracted and extended positions. FIG. 31 shows an embodiment in which the stand-behind platform 3008 pivots between the extended and retracted position. As shown, the tracks 3004, 3006 includes a leading angled portion 3012 and a trailing angled portion 3014, which may be helpful for undulated terrain or off-road situations to provide clearance to pass over rocks or off-road terrain. Additionally, this may provide clearance for traversing over a curb or step.

Figure 32:
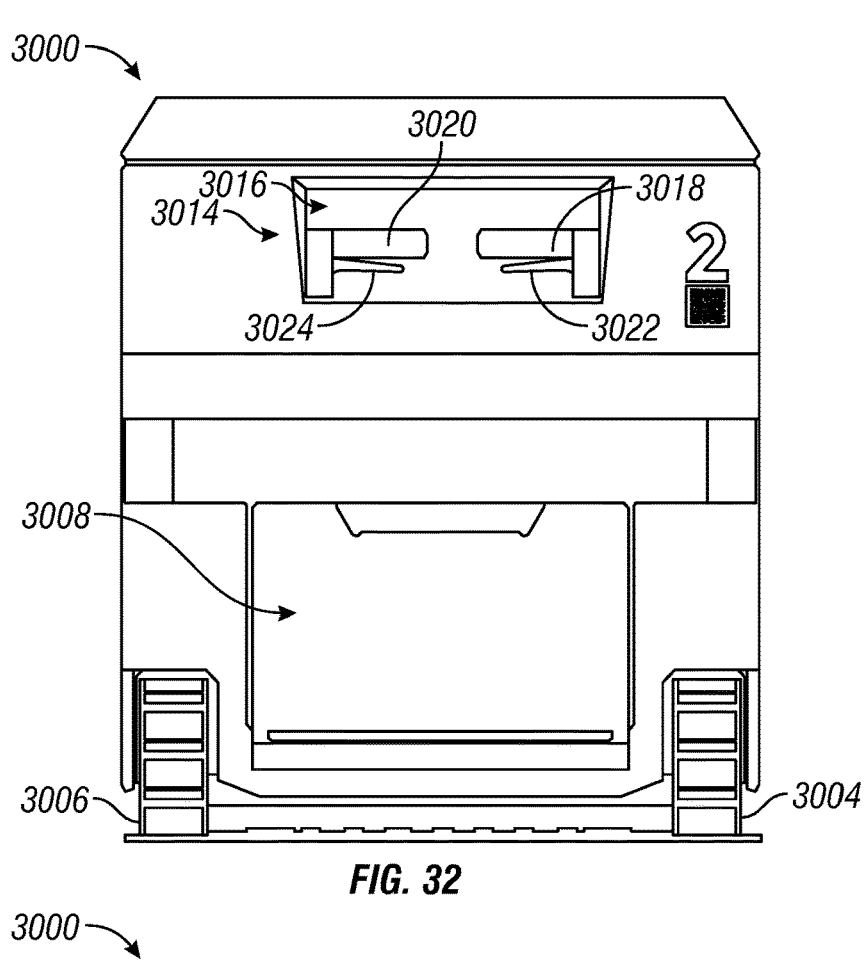
FIG. 32 is a right side view of the example electronic cart shown in FIG. 30.
Figure 33:
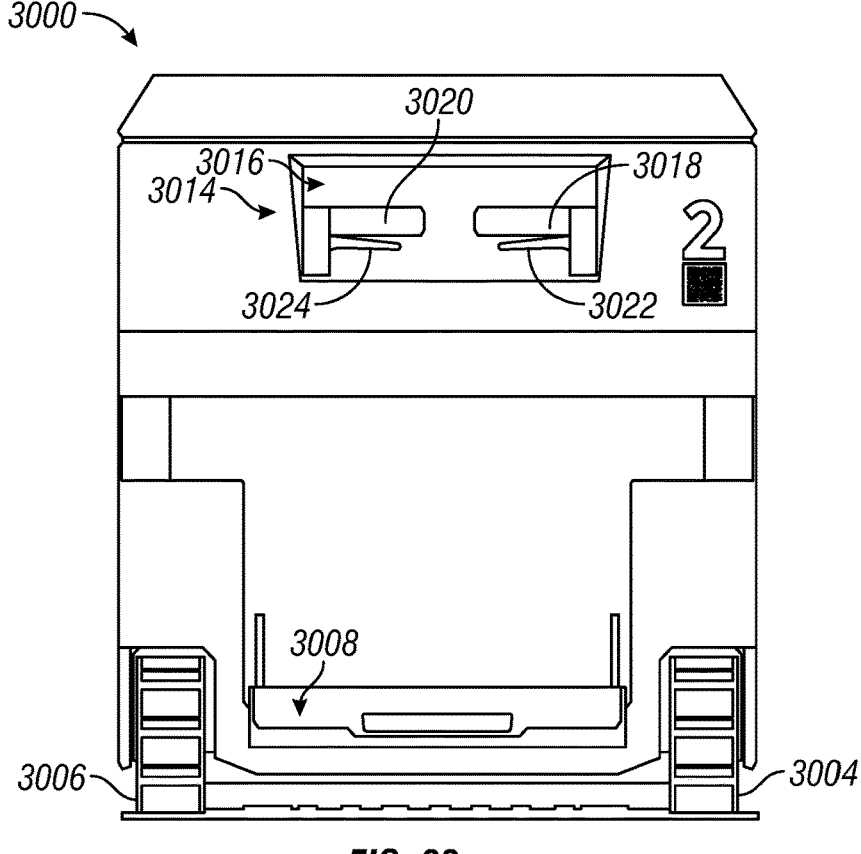
FIGS. 33 and 34 are rear views of the example electronic cart shown in FIG. 30, with the stand-behind platform in the retracted and extended positions, respectively.
Figure 34:
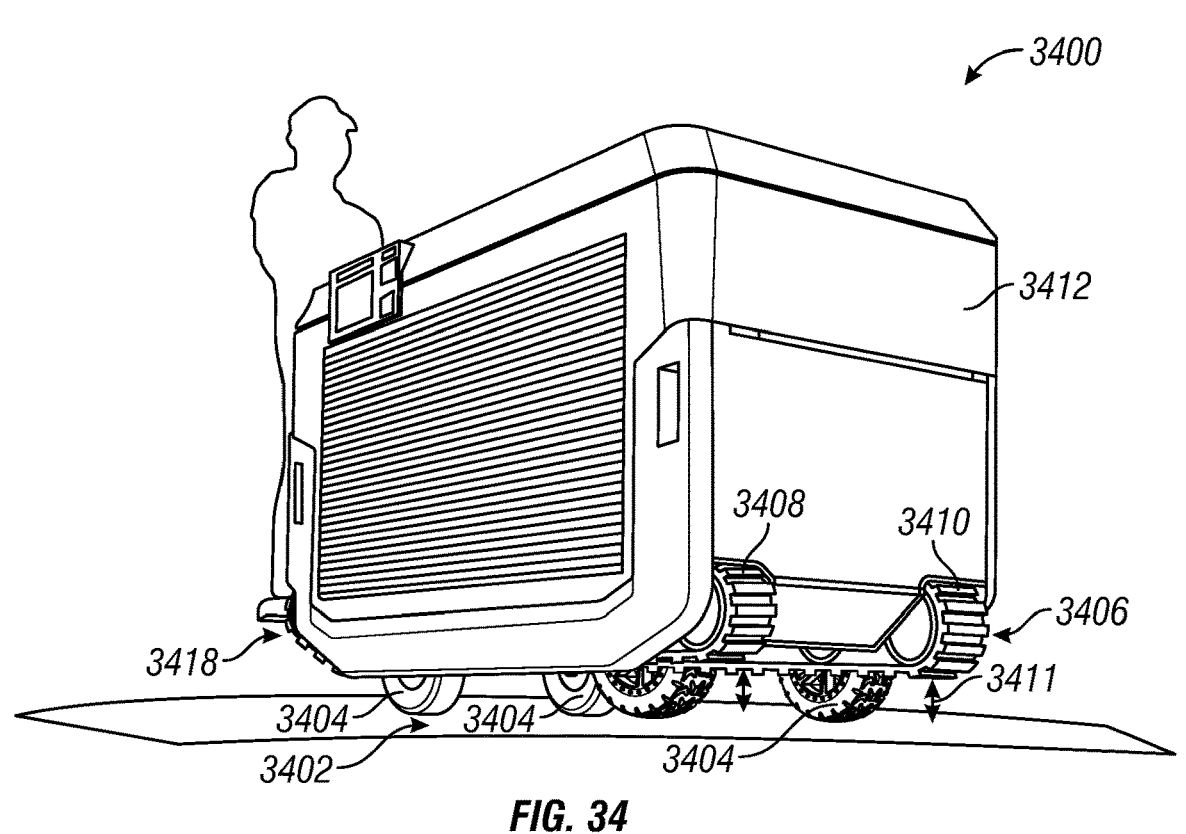

Referring now to FIGS. 32 and 33, an example of drive controls 3014 can be seen. In this example, the cart 3000 includes a recessed portion 3016 in which the drive controls 3014 are located. As shown, the drive controls 3014 do not extend out of the recessed portion 3016. This embodiment of the drive controls 3014 includes a first track control 3018 that controls the throttle for the first track 3004 and a second track control 3020 that controls the throttle for the second track 3006. As shown, the first/second track controls 3018, 3020 are embodied as handles that can be twisted to control throttle of their respective tracks. Depending on the circumstances, the first/second track controls 3018, 3020 could be twisted in a second direction to control forward/reverse of the tracks 3004, 3006. In the embodiment shown, a first brake control 3022 is associated with the first track control 3018 and a second brake control 3024 is associated with the second track control 3020. The brake controls 3022, 3024 may be configured to apply braking to the respective tracks 3004, 3006. In the embodiment shown, the brake controls 3022, 3024 are levers, but could be dials, buttons, or other mechanical or electrical control devices. Likewise, although this embodiment shows the track controls 3018, 3020 as handles that are twisted for purposes of example, the track controls 3018, 3020 could be levers, buttons, or other mechanical or electrical control devices for controlling the speed of the tracks.

Figure 35:
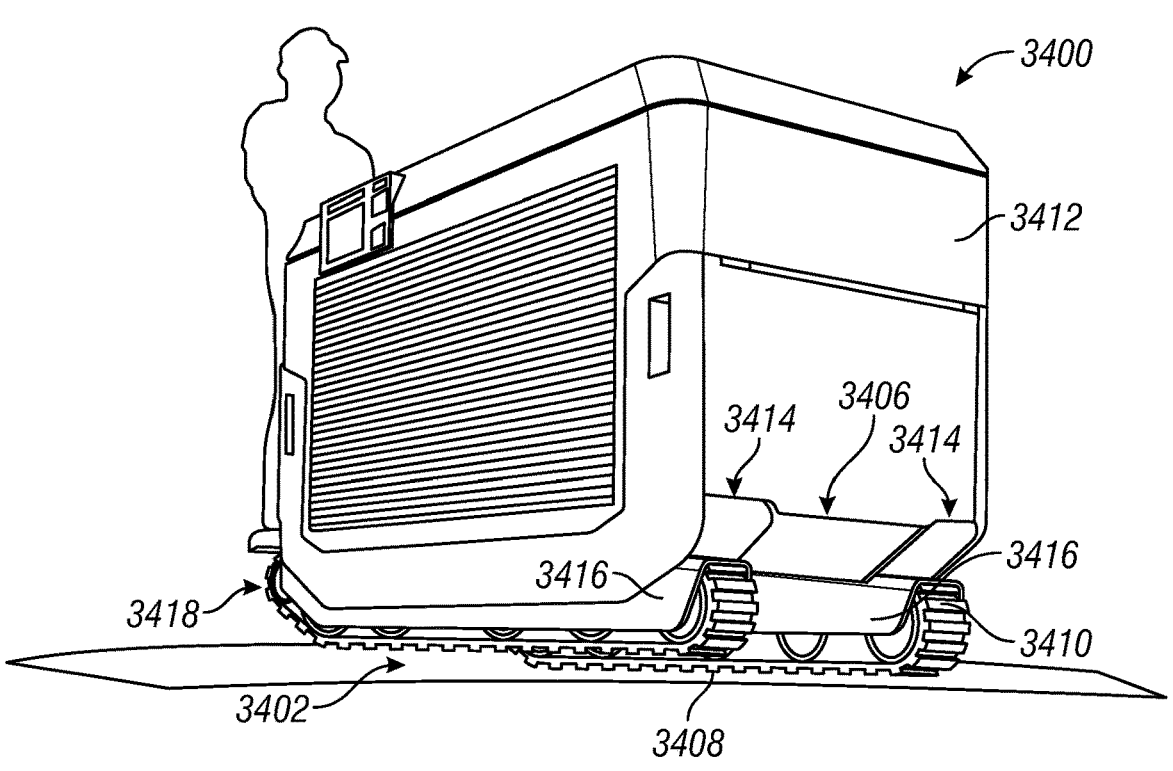
FIG. 35 is a right side perspective view of the example electronic cart shown in FIG. 34 with the track assembly engaging the ground.
Figure 36:
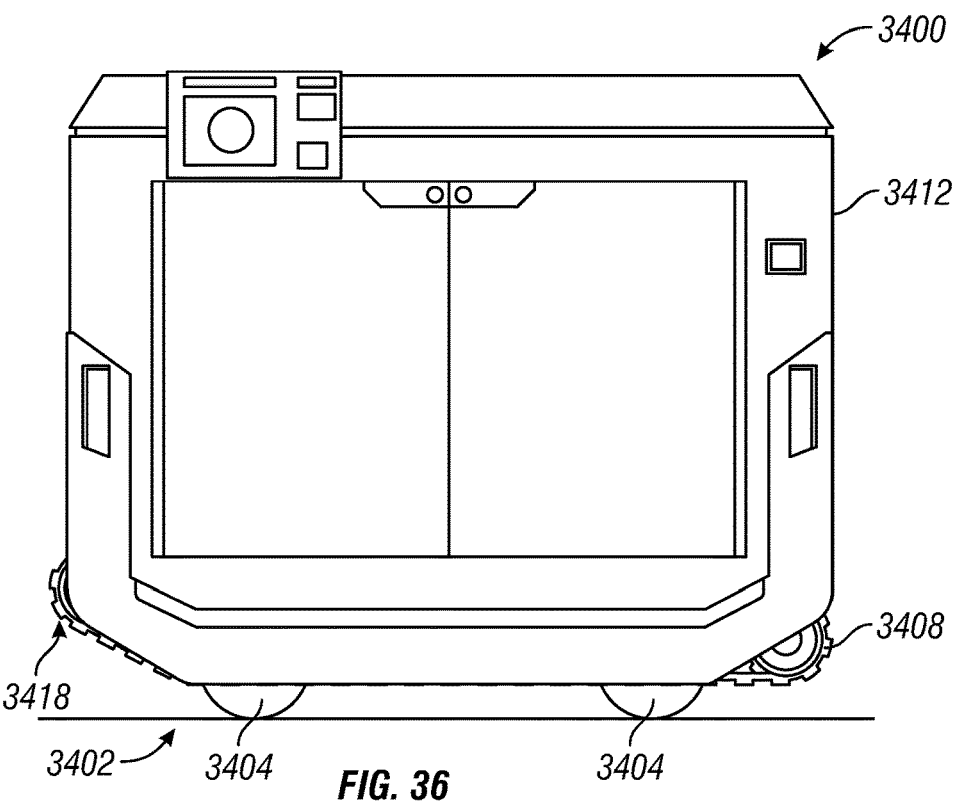
FIG. 36 is a right side view of the example electronic cart shown in FIG. 34.
Figure 37:
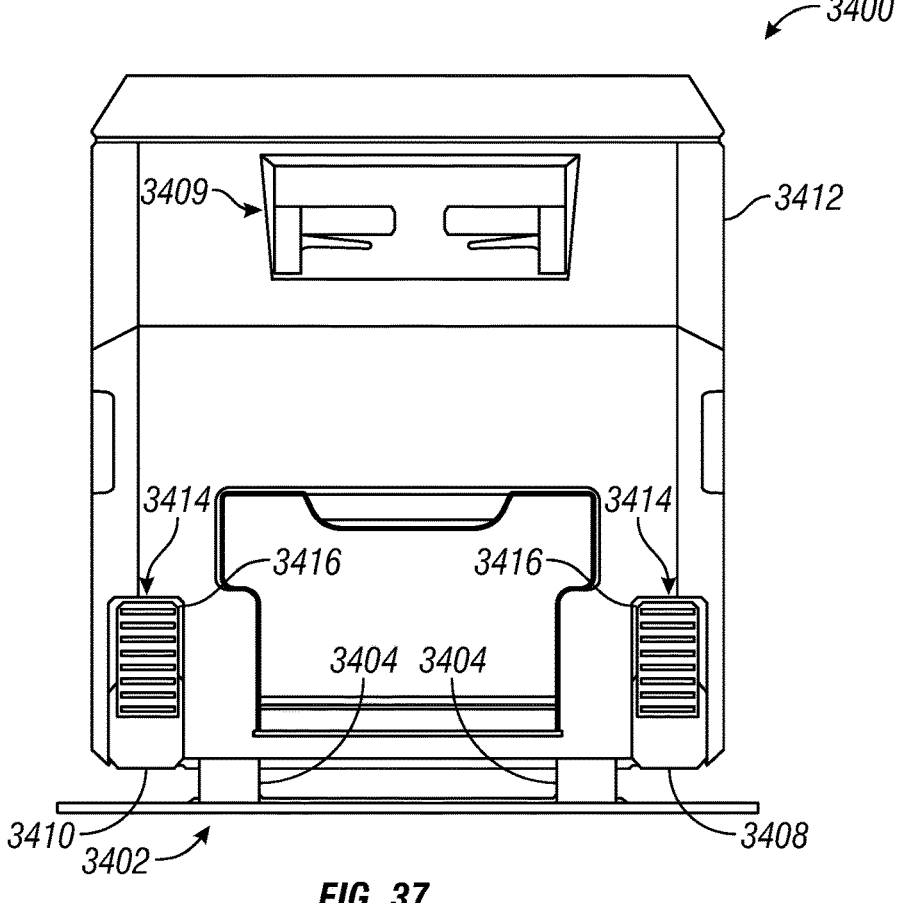
FIG. 37 is a rear view of the example electronic cart shown in FIG. 34.
Figures 38, 39:
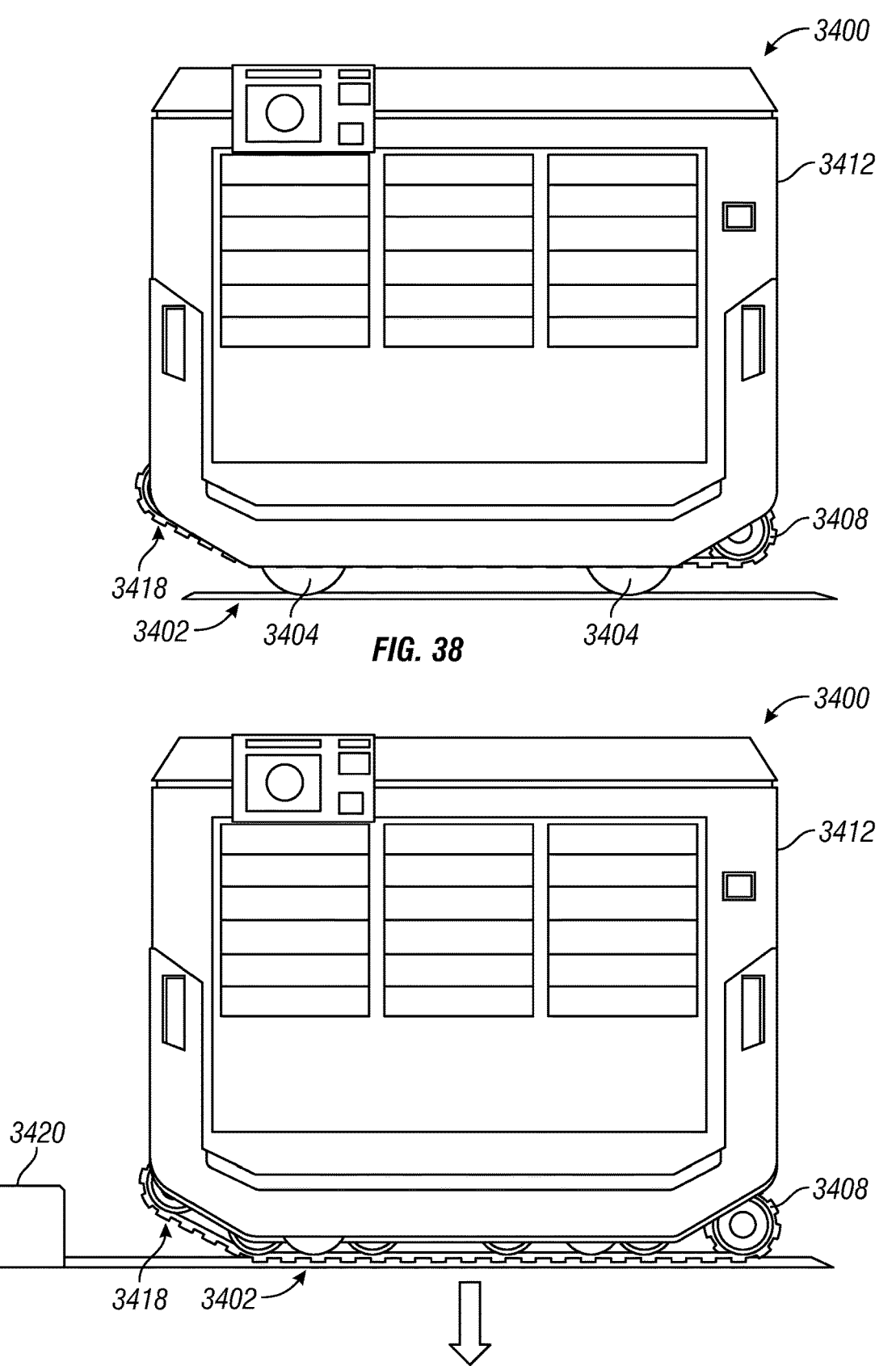
FIGS. 38-40 are progressive views of the electronic cart shown in FIG. 34 transitioning from wheels engagement to track assembly engagement to traverse over a curb.
Figures 40, 41:
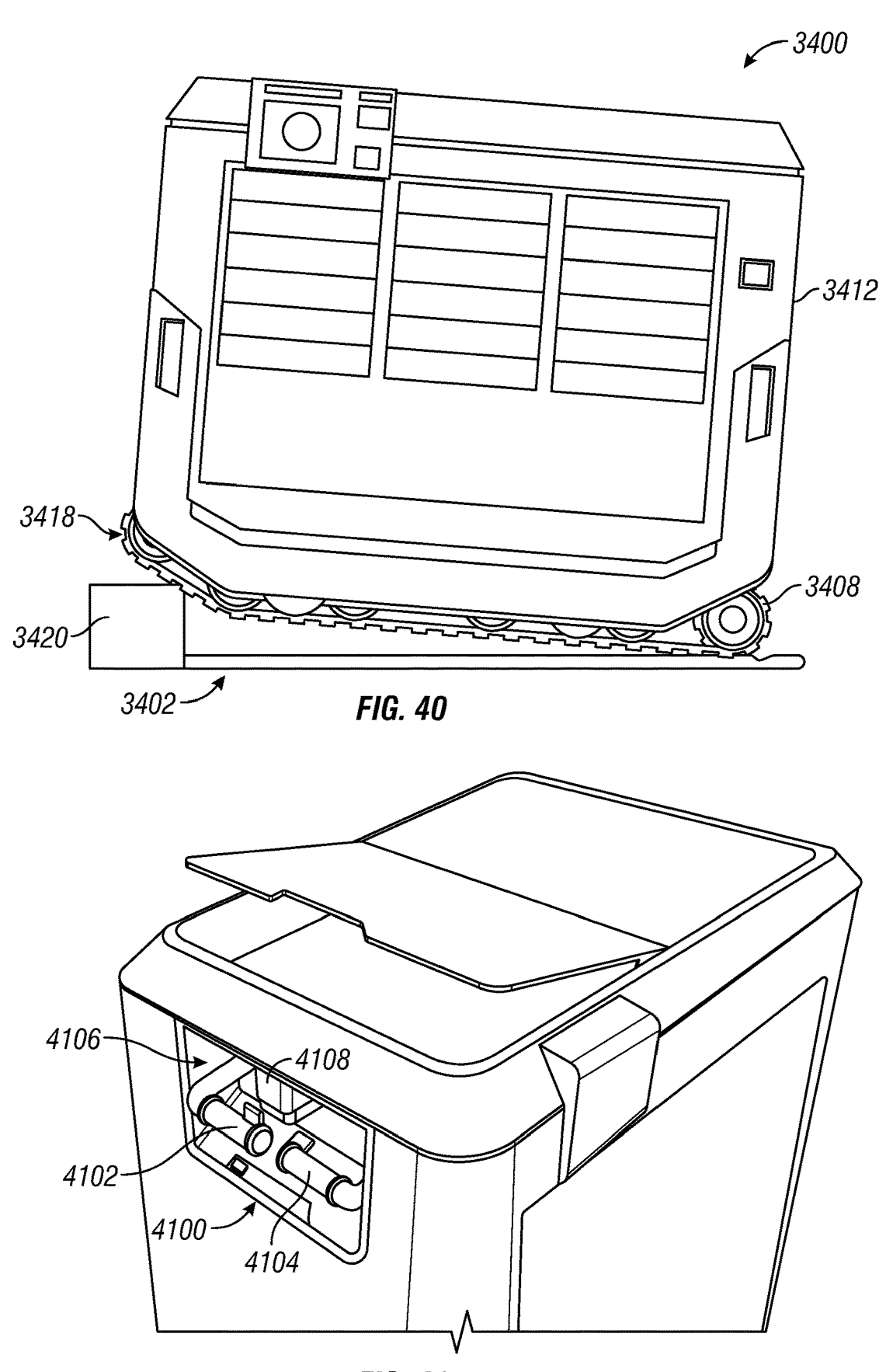
FIG. 41 is a rear perspective view of example drive controls that could be used with one or more electronic carts described herein that is movable between a retracted position and an extended position.

FIGS. 34-40 show another embodiment of an electronic cart 3400 with a hybrid drive system 3402 that is switchable between wheels 3404 engaging the ground (FIGS. 34, 36, 37, 38) and a track assembly 3406 engaging the ground (FIGS. 35, 39, 40). This provides flexibility in choosing between wheels driving the cart 3400 and a track assembly 3406 driving the cart 3400 since one type of drive system may be more appropriate depending on the terrain that is being traversed. Consider an example in which the cart 3400 is unloaded from a delivery truck for one or more deliveries to an office building. The cart 3400 may encounter a variety of terrains, both paved and unpaved, from the delivery truck to entry within the building; in some cases, the cart 3400 may need to traverse a curb or a step between the delivery truck to the delivery location. In situations where the cart 3400 goes inside a building, the cart 3400 may encounter various types of flooring, such as carpet or tile, that may be easily marred or damaged and selection of the wheels 3404 to drive the cart may be more appropriate than the track assembly 3406. Accordingly, the user may switch from the cart 3400 being wheel driven to track driven when the terrain is rough, uneven or unpaved, and in circumstances where a curb and/or step needs to be traversed. Although the description of the cart 3400 is focused on the drive selection and control, the cart 3400 may include one or more of the other components or functions described herein with respect to other embodiments.

In some embodiments, the track assembly 3406 is movable between a retracted position (FIGS. 34, 36, 37, 38) in which the track assembly 3406 does not engage the ground and an extended position (FIGS. 35, 39, 40) in which the track assembly 3406 engages the ground. The arrows 3411 shows the direction of movement up/down for the track assembly 3406 in the embodiment shown. For example, as the track assembly 3406 moves toward the extended position, the track assembly 3406 extends outwardly beyond the wheels 3404, which causes the wheels 3404 to lift off the ground so that only the track assembly 3406 engages the ground and drives the cart 3400. Conversely, as the track assembly 3406 moves towards the retracted position, the track assembly 3406 will retract to a position in which the wheels 3404 extend beyond the track assembly 3406 (appearing that the wheels 3404 are lowering towards the ground as the track assembly 3406 retracts), and the wheels 3404 will then engage the ground to drive the cart 3400. Although the track assembly 3406 moves between extended/retracted positions in the embodiment shown, the wheels 3404 could move between extended/retracted positions instead of the track assembly 3406 depending on the circumstances.

In the embodiment shown, the track assembly 3406 includes a first track 3408 and a second track 3410 that may be independently controlled by one of more drive controls 3409 (FIG. 37). The one or more drive controls 3409 may also control the wheels 3404. In some cases, the drive controls 3409 may control the speed of each track 3408, 3410 and/or the speed of the wheels 3404, such as described with regard to the drive controls 3014 or other drive controls described herein. In some cases, the one or more drive controls 3409 may also be used for switching the track assembly 3406 between its extended/retracted positions.

As shown, the body 3412 of the cart 3400 includes longitudinally-extending recessed areas 3414 that are dimensioned to receive each track 3408, 3410 of the track assembly 3406 when in the retracted position. As shown, the tracks 3408, 3410 include a longitudinally-extending frame 3416 that is shaped to conform to the shape/dimensions of the recessed areas 3414. For example, the longitudinally-extending frame 3416 of each track 3408, 3410 may be C-shaped to conform to a C-shaped recessed area. Of course, the frame 3416 and/or the recessed areas could be different shapes depending on the circumstances.

In some cases, one or more ends of the tracks 3408, 3410 may include an angled portion 3418. As shown, the tracks 3408, 3410 includes an angled portion 3418 on the trailing end of the cart 3400, which provides clearance for the cart 3400 to traverse a curb or step 3420 going in the reverse direction (see FIG. 40). However, the angled portion 3418 could be on the front end and/or both ends of the tracks 3408, 3410.

FIG. 37 shows a rear view in which the tracks 3408, 3410 are in a retracted position so the wheels 3404 drive the cart 3400. An embodiment of the drive controls 3409 can also be seen. Depending on the circumstances, the drive controls 3409 could be used to control both the wheels 3404 and track assembly 3406. In some cases, there could potentially be separate drive controls for the wheels 3404 and track assembly 3406. Although the drive controls 3409 are shown on the same end as the platform in the embodiment shown, additional (redundant or additional) controls could be found on the other end or sides of the cart 3400.

FIGS. 38-40 show a progression of the cart 3400 transitioning from being wheel-driven (FIG. 38) to track-driven (FIGS. 39-40) and then in the track-driven position, traversing over a step or curb (FIG. 40). In FIG. 38, the tracks 3408, 3410 are in the retracted position so the cart 3400 is driven by the wheels 3404. In FIG. 39, the tracks 3408, 3410 have extended downwardly to an extended position beyond the wheels 3404 so that the tracks 3408, 3410 engage the ground and not the wheels 3404. In this position, the cart 3400 is track driven instead of being driven by the wheels 3404. As can be seen in the example of FIG. 39, the angled portion 3418 of the cart 3400 is moving towards a step or curb 3420. In FIG. 40, the cart 3400 has moved towards the curb 3420 so that the angled portion 3418 has engaged the curb 3420 to lift the cart 3400 upwards off the ground. The cart 3400 continues moving in that direction and, thereby, traverses over the curb 3420. Upon moving past the curb 3420, depending on the remaining terrain to the delivery destination, the cart 3400 may then be switched to being wheel driven or could remain in the track-driven configuration.

Figure 42:
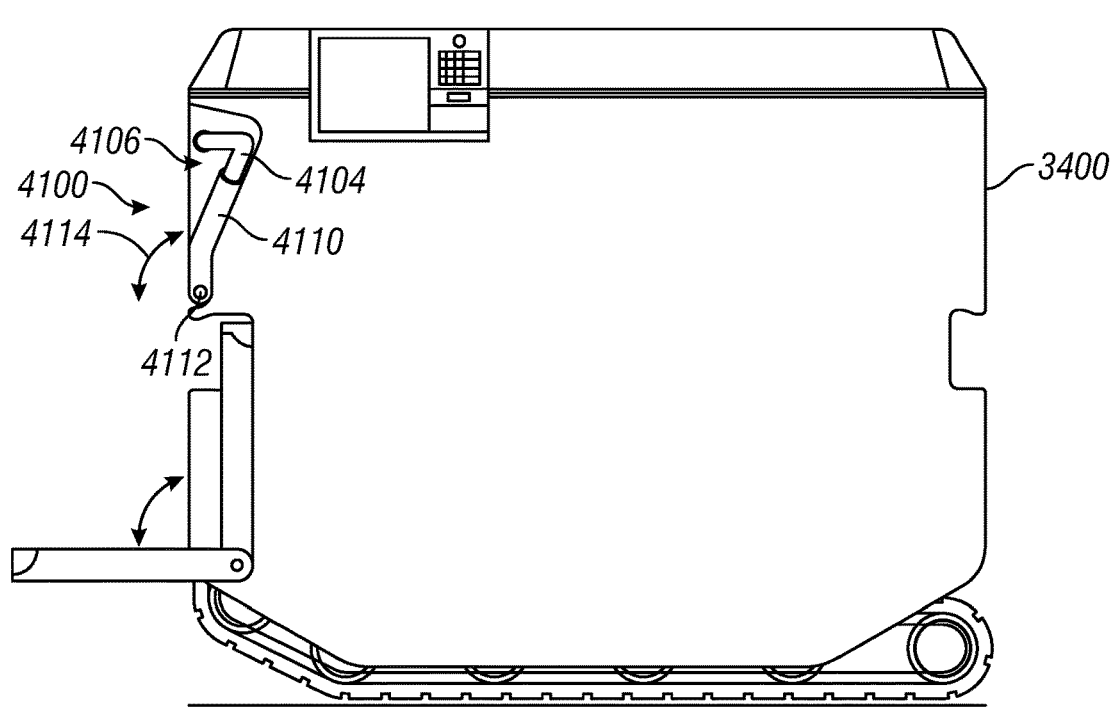
FIG. 42 is a side cross-sectional view of the example drive controls shown in FIG. 41 to show an example pivot point for the drive controls to move between its extended and retracted positions.
Figure 43:
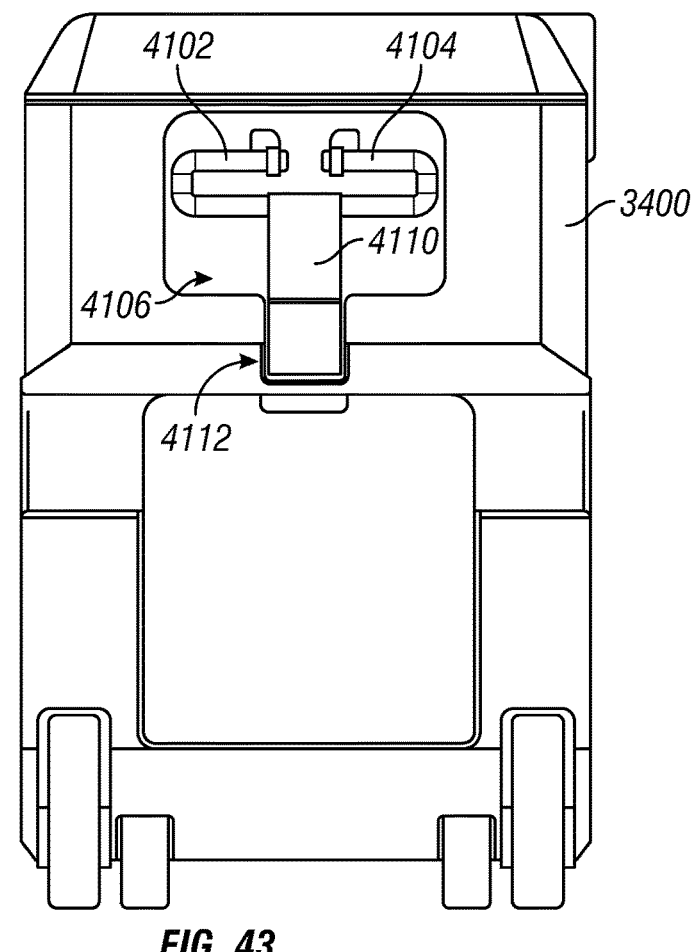
FIG. 43 is a rear view of the example drive controls shown in FIG. 41.

FIGS. 41-43 illustrate example drive controls 4100 for controlling speed and/or direction of the cart that may be used with one or more of the electronic carts described herein. In this embodiment, the drive controls 4100 are movable between a retracted position and an extended position. As shown, the drive controls 4100 are embodied as a first handle 4102 and a second handle 4104. However, the drive controls 4100 may be embodied as any other type of drive control mechanism, such as levers, buttons, etc. In the retracted position, the drive controls 4100 are substantially positioned within a recessed area 4106. In the extended position, the drive controls 4100 are extended out of the recessed area 4106.

In the example shown, there is a latch assembly 4108 associated with the drive controls 4100 that may be actuated to release the drive controls 4100 so they can be moved between their extended and retracted positions. For example, the latch assembly 4108 may include a button, lever or other mechanism for actuation. When user actuates the latch assembly 4108, this releases the drive controls 4100 so that they are movable between their extended/retracted positions. The drive controls 4100 may then be moved to an extended/retracted position and be locked in place. For example, the drive controls 4100 may include a detent at the extended and retracted positions to fix the drive controls 4100 in place upon reaching those positions. In some embodiments, the detent could be overcome by actuating the latch assembly 4108. When the user is done with the drive controls 4100 in the extended position, for example, the latch assembly 4108 may then be actuated so the drive controls 4100 can be released and moved back to the retracted position, where they are latched in place. In some embodiments without a latch assembly 4108, the user may overcome the detent by applying a certain level of force on the drive controls 4100.

In some cases, the drive controls 4100 could be configured to disable the drive system when in the retracted position. Depending on the circumstances, the drive controls 4100 may be electronically movable between the extended and retracted positions. For example, the user may have a keyfob that causes the drive controls 4100 to automatically move to the extended position upon being within a wireless range of the keyfob and automatically move to the retracted position upon moving outside the wireless range.

In the example shown in FIG. 42, the drive controls 4100 are pivotally connected within the recessed area 4106. For example, as shown, the drive controls 4100 are attached to a pivot arm 4110, which is pivotally connected to the body of the cart 3400 with a pivot pin 4112. In embodiments with a latch assembly 4108, the pivot arm 4110 is pivotably about the pivot pin 4112 to move the drive controls 4100 (handles 4102, 4104 in the embodiment shown) upon releasing the latch assembly 4108. As shown, for example, the drive controls 4100 may pivot along line 4114 in FIG. 42. In the embodiment shown, the drive controls 4100 pivot about approximately a horizontal axis. Referring to FIG. 43, there is shown an embodiment with the first handle 4102 and second handle 4104 each connected to a first end of the pivot arm 4110 and the second end of the pivot arm 4110 is pivotally connected to the cart's body with the pivot pin 4112. Although the examples in FIGS. 42 and 43 are illustrated with respect to the cart 3400 that has the hybrid drive system, the drive controls 4100 could be movable between the extended/retracted positions with any embodiments of the electronic cart described herein.

Figure 44:
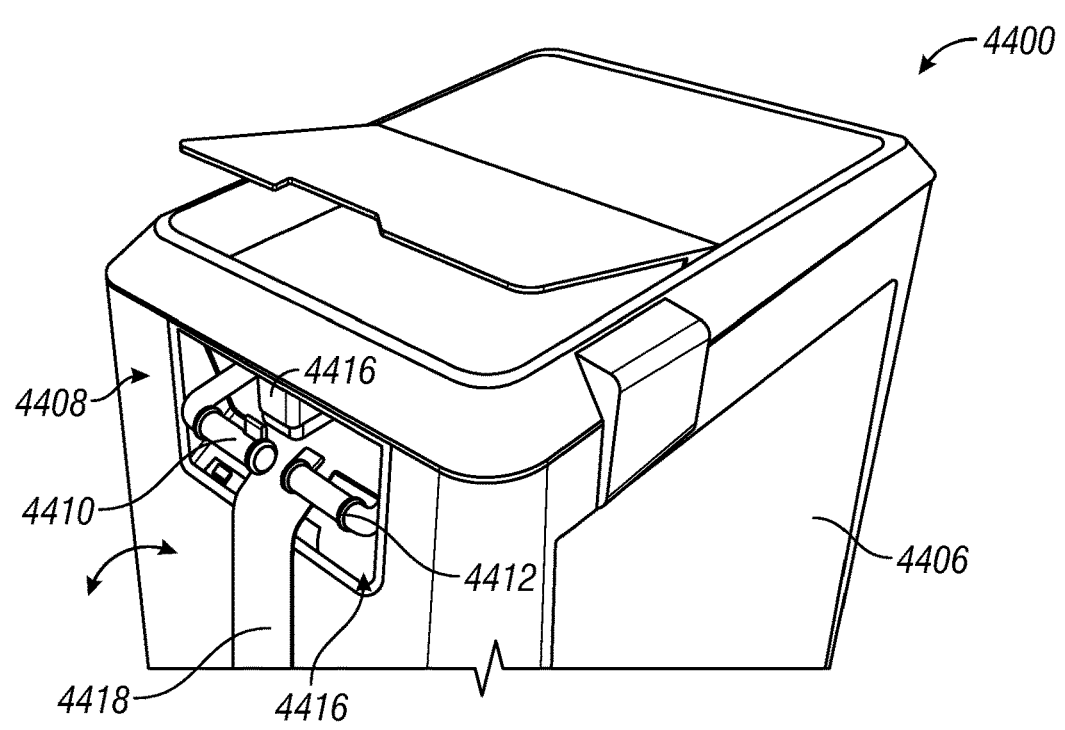
FIG. 44 is a rear perspective view of an example electronic cart according to another embodiment that can be used to climb stairs.
Figure 45:
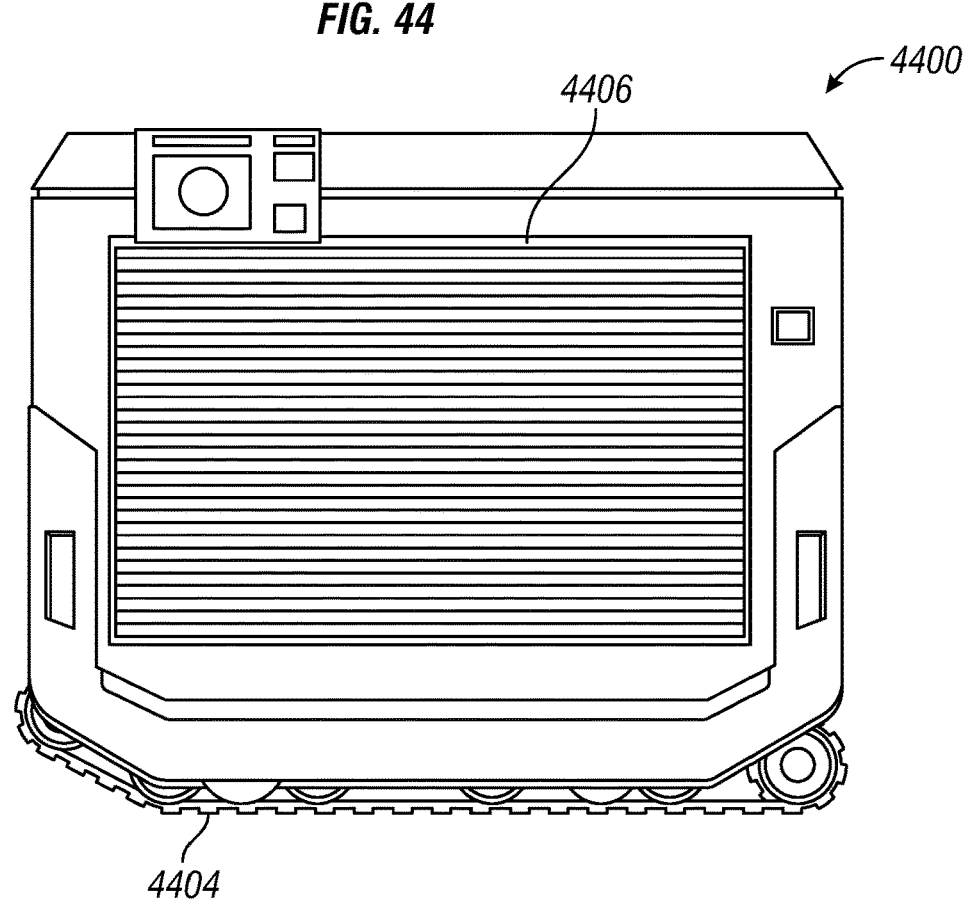
FIG. 45 is a right side view of the example electronic cart of FIG. 44.
Figure 46:
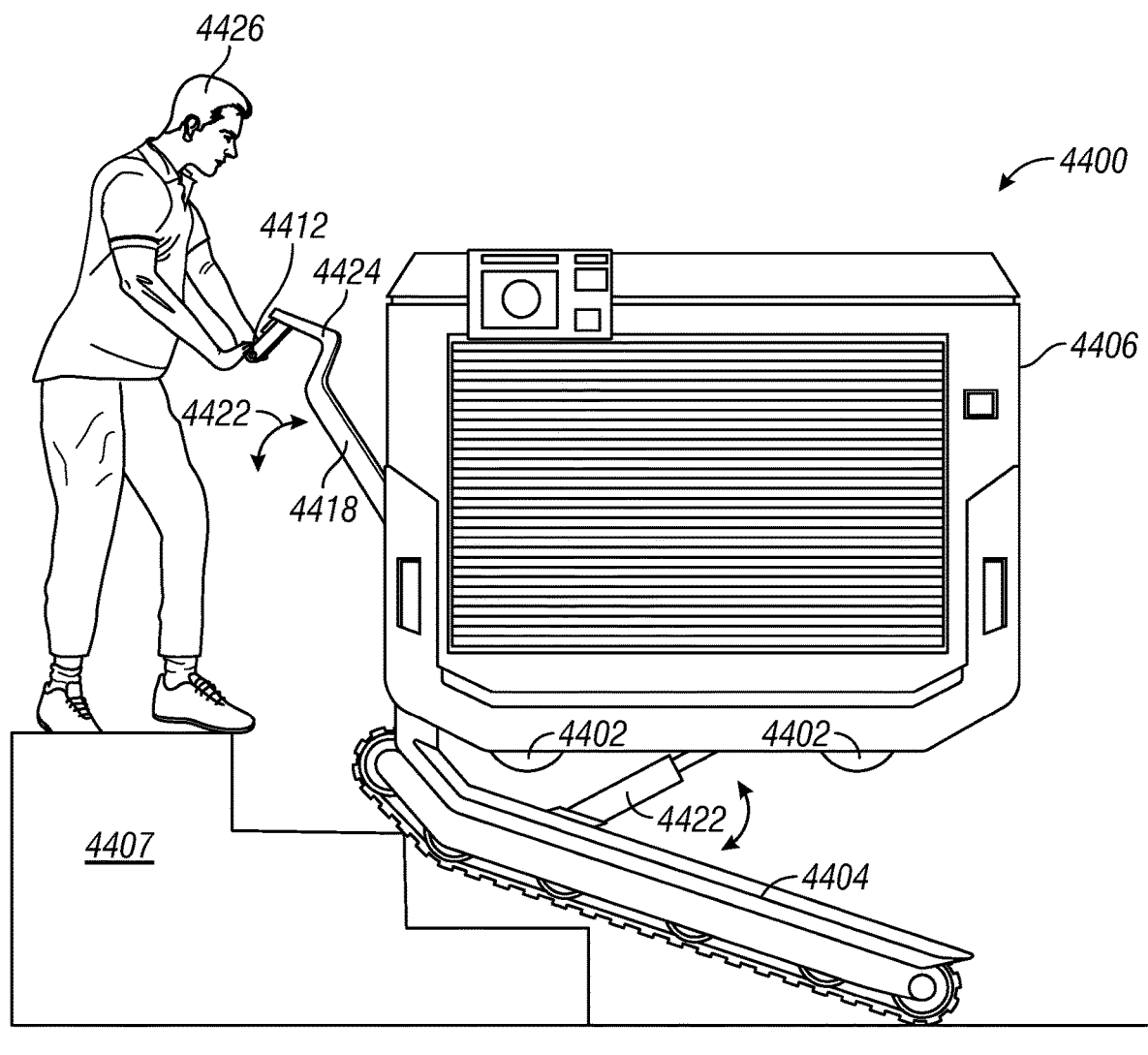
FIG. 46 is a right side view of the example electronic cart of FIG. 44 in a stairs climbing mode.

FIGS. 44-46 illustrate another embodiment of an electronic cart 4400 that is configured to climb stairs or a steep incline. In the embodiment shown, the electronic cart 4400 includes a drive system similar to the hybrid drive of cart 3400 with both wheels 4402 (FIG. 46) and a track assembly 4404 to drive the cart 4400. However, in the drive system of cart 4400, there is a stairs climbing mode in which the track assembly 4404 is configured to separate from the body 4406 of cart 4400. In the embodiment shown, the track assembly 4404 is pivotally connected to the 4406 body of the cart 4400 (see FIG. 46).

Referring to FIG. 44, there is shown an embodiment of drive controls 4408 for the cart 4400. In the embodiment shown, there is a first handle 4410 and second handle 4412 for controlling the speeds/direction of corresponding tracks of the track assembly 4404 and/or wheels 4402. For example, twisting first handle 4410 in a first direction controls speed of corresponding track in a forward direction and twisting the first handle 4410 in a second, opposite direction controls speed of the corresponding track in a reverse direction. The second handle 4412 could work similarly with a corresponding track to twist in a first direction to control speed in a forward direction and twist in a second direction to control speed in a reverse direction. Although the speed control of the tracks in the track system 4404 are embodied as handles as shown for purposes of example, the drive controls 4408 could be levers, buttons or other speed/direction control mechanisms. In some cases, there may be a separate direction controller (e.g., park, forward, reverse) such that handles 4410, 4412 are used solely for controlling the throttle to adjust speed of respective tracks of the track assembly 4404.

In the embodiment shown, the drive controls 4408 are movable between a retracted position (FIGS. 44-45) in which the drive controls 4408 are within the recessed area 4414 and an extended position (FIG. 46) in which the drive controls 4408 extend out of the recessed area 4414. In the example shown, there is a latch assembly 4416 associated with the drive controls 4408 that may be actuated to release the drive controls 4408 so they can be moved between their extended and retracted positions. For example, the latch assembly 4416 may include a button, lever or other mechanism for actuation. The user may actuate the latch assembly 4414, which may release the drive controls 4408 so that they are movable. The drive controls 4408 may then be moved to an extended position and be locked in place. For example, the drive controls 4408 may include a detent (not shown) at the extended and retracted positions to snap into place upon reaching those positions. In some embodiments, the detent could be overcome by actuating the latch assembly 4416. When the user is done with the drive controls 4408 in the extended position, the latch assembly 4416 may then be actuated so the drive controls 4408 can be moved back to the retracted position, where they are latched in place. In some embodiments without a latch assembly 4416, the user may overcome the detent by applying a certain level of force on the drive controls 4408.

In some cases, the drive controls 4408 could be configured to disable the drive system when in the retracted position. In some cases, the drive controls 4408 could limit steering in the extended position. For example, the drive controls 4408 may lock the speed of the tracks to operate at the same speed so the cart 4400 only drives in a substantially straight line when in the extended position. By locking the relative speeds of the tracks when the drive controls 4408 are in the extended position so the cart 4400 can only drive in a straight line, this can be advantageous while claiming up stairs 4407 (FIG. 46), in which steering is not needed or turning is undesirable. For example, when in the extended position, the first and second handles 4410, 4412 could each drive both tracks instead of only the corresponding single track. This would allow the user to use either handle 4410 or 4412 to drive the cart 4400 in a substantially straight line up the stairs 4407. Depending on the circumstances, the drive controls 4408 may be electronically movable between the extended and retracted positions. For example, the user may have a keyfob that causes the drive controls 4408 to automatically move to the extended position upon being within a wireless range of the keyfob and automatically move to the retracted position upon moving outside the wireless range.

In the example shown, the drive controls 4408 are pivotally connected to the body 4406 of the cart 4400. For example, the drive controls 4408 may be pivotally attached to the cart 4400 with a pivot arm 4418, which could be pivotally connected to the cart 4400 with a pivot pin (not shown). In embodiments with a latch assembly 4108, the pivot arm 4118 is pivotably about a pivot pin (not shown) to move the drive controls 4408 (handles 4410, 4412 in the embodiment shown) upon releasing the latch assembly 4416. As shown, for example, the drive controls 4408 may pivot along line 4422 in FIG. 46. In the embodiment shown, the drive controls 4408 pivot about approximately a horizontal axis. In some embodiments, the pivot arm 4118 includes a C-shaped distal end 4424 and a proximal end pivotally connected to the body 4406 of the cart 4400.

In some embodiments, as discussed herein, the track assembly 4404 is pivotally connected with the body 4406 of the cart 4400. In some cases, a linear actuator 4422, such as a hydraulic actuator, could be controlled to separate the track assembly 4404 and the body 4406 of the cart 4400 as shown in FIG. 46. In some embodiments, the release of the drive controls 4408 could release the track assembly 4404 to pivot with respect to the body 4406. Depending on the circumstances, the linear actuator 4422 could be automatically controlled so the body 4406 of the cart 4400 is continuously adjusted to be approximately horizontally-oriented going up the stairs 4407, such as shown in FIG. 46. In some cases, the drive controls 4408 may include a control for the linear actuator 4422 to adjust the relative angle between the body 4406 of the cart 4400 and the track assembly 4404. As shown in FIG. 46, the drive controls 4408 are in the extended position so the user 4426 can use the drive controls 4408 even though the user 4426 is vertically elevated (e.g., up a step) with respect to the cart 4400. In this manner, the user 4426 can actuate the drive controls 4408 (e.g., twist either of the handles 4410, 4412) to have the cart 4400 climb the stairs 4407. This embodiment allows a user select between wheel driven and track driven, and also traverse up or down stairs by pivoting the track assembly 4404 with respect to the body 4406.

Figure 47A:
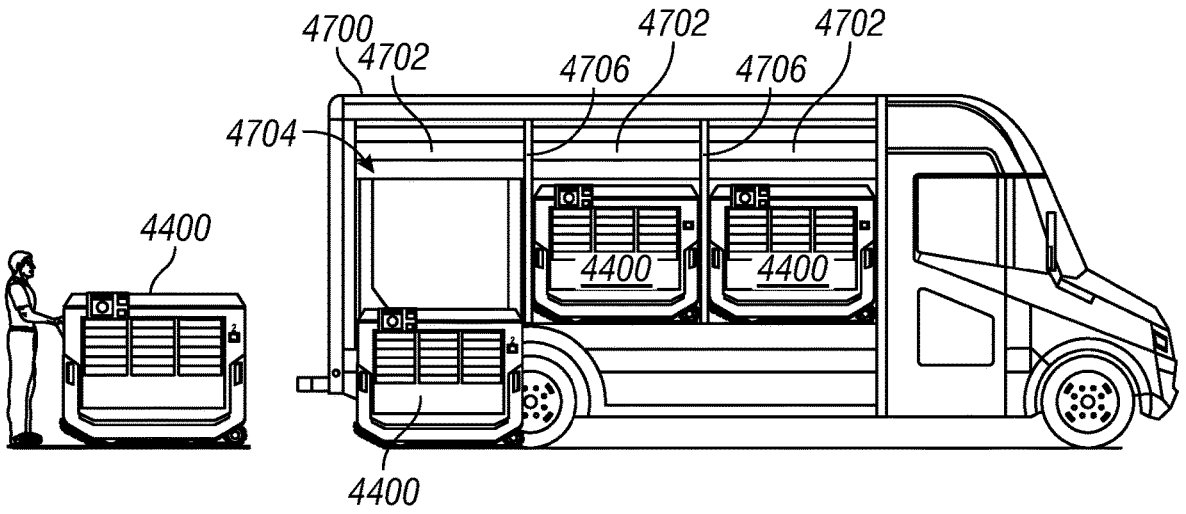
FIG. 47A is a right side view of an example side-loading trailer loaded with a plurality of pods and one of the carts unloaded according to an embodiment of this disclosure.

FIG. 47A illustrates an example side-loading delivery vehicle 4700 similar to that shown in FIGS. 14-17 and 23-25. In the example shown, the side-loading delivery vehicle 4700 includes one or more side door(s) 4702 that can be opened for accessing the rear storage 4704 and the door(s) 4702 are closed during transport. In the example shown, there are three doors 4702 shown for purposes of example to access three compartments of the rear storage 4704 that are separated by walls 4706, but more or less doors 4702 and separate compartments could be provided depending on the circumstances. In some embodiments, the side-loading delivery vehicle 4700 may include side door(s) 4702 on both the left and right sides, on the left side only, or on the right side only. In the example shown, the door(s) 4702 are roller-style doors that are configured to roll up to an open position in which the door slides upward near the top wall of the rear storage 4704. However, depending on the circumstances, there may be embodiments of the side-loading delivery vehicle 4700 in which the door(s) 4702 may be sliding or swinging style doors. As shown, multiple electronic carts 4400 may be loaded into the vehicle 4700. As discussed herein, the side-loading delivery vehicle 4700 may include an integral transfer system for moving one or more carts 4400 in the rear storage 4704 in/out.

Figure 47B:
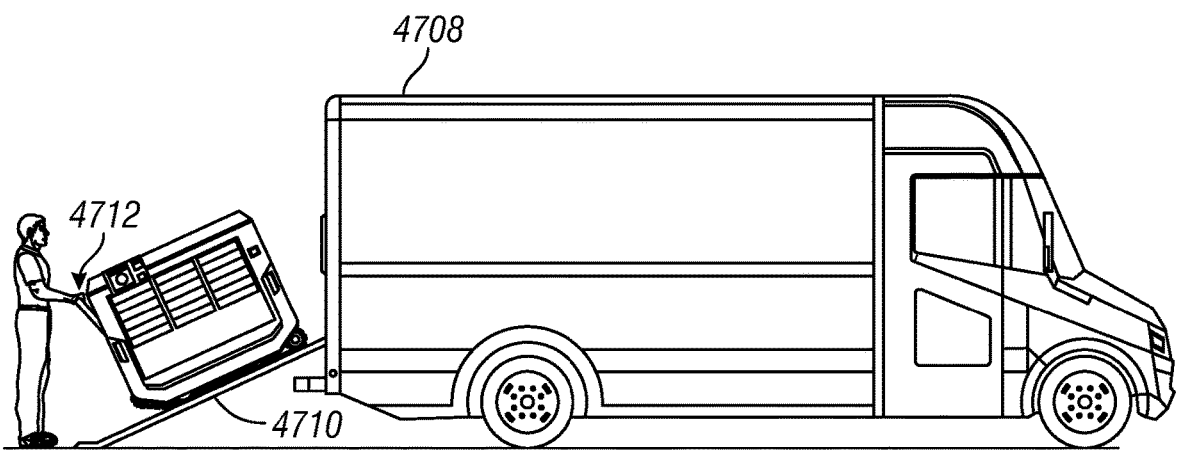
FIG. 47B is a right side view of an example rear-loading trailer with an electronic cart being driven up a ramp into a rear storage area according to an embodiment of this disclosure.

FIG. 47B illustrates an example rear-loading delivery vehicle 4708 with a ramp 4710 extended for the electronic cart 4400 to be driven (either wheel-driven or track-drive) up the ramp 4710 to load into the vehicle's 4800 rear storage area. Conversely, the electronic cart 4400 could be driven down the ramp to unload from the rear storage area. Although the electronic cart 4400 is being controlled using driven controls 4712 onboard the cart 4400 in the example shown, the cart 4400 could be remotely controlled in some embodiments depending on the circumstances.

FIG. 48 illustrates an embodiment of a system 4800 for controlling locking/unlocking of compartments of the electronic cart/pod. In some embodiments, the system 4800 solves the technical problem of a secure holding place for packages to be delivered that can be dropped off at any location. The plurality of compartments of the electronic cart can be loaded with packages and unlock codes for each compartment can be sent to each recipient. The electronic cart can be dropped off at a location, such as an office building or apartment, and recipients use their mobile devices to communicate their unlock code to the electronic cart to unlock the compartment corresponding to the recipient's package. The system 4800 could be used with any of the carts/pods described herein.

In the embodiment shown, the electronic cart 4802 includes a drive system 4804 for driving the wheels and/or tracks, one or more batteries 4806 for powering the cart 4802, a charging circuit 4808 for charging the cart's 4800 battery 4806, one or more cart controls 4810 for controlling any of the functions of the cart 4802, a temperature control system 4812 in embodiments in which one or more compartments of the cart 4800 are climate controlled (e.g., frozen, cooled or heated goods), one or more status indicators 4814 for indicating one or more statuses of the cart 4802, and an alarm system 4816 for controlling an alarm regarding the cart 4800.

As shown, the cart 4802 includes a locking control subsystem 4818 for controlling locking/unlocking of one or more compartments of the cart 4802. For example, the locking control subsystem 4818 may be configured to control locking/unlocking of compartments based on one or more messages from a remote locking control system 4820 that communicates with the locking control subsystem 4818 over a network 4822. For example, the remote locking control system 4820 could be configured based on a warehousing or other logistics system for managing loading of the compartments with specific packages for delivery and associating a pincode with each compartment for unlocking the packages. Upon the packages being loaded into the compartments, the remote locking control system 4820 may send a message to the recipient of each package with the pincode or unique identifier, such as a bar code or QR code, for unlocking the compartment in which their package is located. Upon the cart 4802 being delivered to a predetermined location (e.g., lobby of office or apartment building), the recipient may use a mobile device 4824 (e.g., phone, tablet, computer, etc.) to communicate with the cart 4802 to communicate the pincode or unique identifier to the cart 4802 for unlocking the compartment in which the recipient's package is located. By way of example, the cart 4802 may include a camera for scanning a barcode or QR code on the mobile device 4824, which was sent to the recipient from the remote locking control system, to unlock the appropriate compartment. In some embodiments, the cart 4802 may include one or more input devices (e.g., touchscreen, keyboard, keypad, etc.) for entering a pincode to uplock the appropriate compartment. In some cases, the compartments may be spring-loaded to automatically open upon unlocking the compartment.

FIG. 49 illustrates an example method 4900 that the cart 4802 may perform during operation to load one or more packages into compartments of the cart 4802. In the example shown, the method 4900 begins at block 4902 in which the cart 4802 receives a request to load the compartments with packages. For example, the cart 4802 may be configured to enter into a package loading mode. Depending on the circumstances, a delivery person could cause the cart 4802 to enter into the package loading mode by selecting one or more input devices and/or entering a passcode. Upon entering into the package loading mode, the delivery person may provide one or more package identifiers to the cart 4802 (block 4904). For example, the delivery person may scan a barcode (or other unique package identifier) with a camera of the cart 4802 to input the package identifier. This could cause the cart 4802 to communicate with the remote locking control system 4820 to receive an unlock code to associate with a compartment, and then unlock that compartment so the delivery person can place the package within the compartment (block 4906). When the cart 4802 detects the compartment is closed (block 4908), the package identifier is associated with the storage compartment (block 4910). Of course, depending on the circumstances, the package identifier may be associated with the storage compartment prior to closing the storage compartment. This allows the cart 4802 to unlock the compartment associated with the package upon the recipient providing a unique identifier or passcode to the cart 4802, which causes the cart 4802 to unlock the compartment with the recipient.

FIG. 50 illustrates an example method 5000 that the cart 4802 may perform during operation to unlock a compartment to deliver a package to a recipient. As shown, the method 5000 begins at block 5002 in which the remote locking control system 4820 sends a notification to the recipient of the package with an unlock code. At some point after the cart 4802 is loaded with the package, the cart 4802 starts a pickup timer. For example, the pickup timer may elapse upon 3 days (or some other time) after the cart 4802 is delivered. Once the pickup timer elapses (5004), a notification may be sent to a delivery company associated with the cart 4802 to pick up the cart (5006). The cart 4802 may also invalidate or cancel the unlock code after the pickup time elapses (block 5008). If the pickup timer has not yet elapsed, the recipient may provide an unlock code to the cart (block 5010). For example, if the unlock code is embodied as a barcode or QR code, the recipient may scan the unlock code with a camera on the cart 4802. In some embodiments, the recipient could enter an unlock code on a keyboard or keypad on the cart 4802. Upon receiving the unlock code, the cart 4802 will unlock the compartment associated with the unlock code (block 5012). Depending on the circumstances, the cart 4802 may include local storage with the unlock code and associated compartments to determine which compartment to open based on the unlock code entered by the user. In some cases, the cart 4802 may communicate the unlock code scanned or entered by the user to the remote locking control system 4820 and request authorization to unlock a compartment. The remote locking control system may then communicate whether the unlock code matches any active unlock codes for the cart 4802 and send an authorization message to the cart 4802 that specifies which compartment to unlock based on the unlock code. Upon detecting that the compartment has been closed (block 5014), the cart 4802 may communicate to the remote locking control system 4820 that the package has been delivered, which updates the delivery status associated with the package identifier (block 5016).

FIGS. 51A-51C illustrates an embodiment of a cart 5100 in which a track assembly 5102 is pivotally connected with a body 5104, similar to the embodiment shown in FIG. 46 with cart 4400. As shown in FIGS. 51B-51C, this allows the cart 5100 to climb up stairs 5105. The track assembly 5102 pivots with respect to the body 5104 along line 5106 as shown so the body 5104 is approximately horizontally oriented as the track assembly 5102 climbs up the stairs 5105. As with the cart 4400 shown in FIG. 46, the cart 5100 shown in FIGS. 51A-51C may be configured in some embodiments to continuously control the angle with which the track assembly 5102 is angled with respect to the body 5104 so the body 5104 maintains an approximately horizontal orientation. For example, the cart 5100 may include a linear actuator 5108 and a linkage assembly 5109 that pivots the track assembly 5102 with respect to the body 5104. For example, the linear actuator 5108 could move to an extended position to pivot the track assembly 5102 away from the body 5104 and could move to a retracted position the pivot the track assembly 5102 towards the body 5104. In this manner, the track assembly 5102 may be moved between a retracted position, such as shown in FIG. 51A, in which the track assembly 5102 is not angled with respect to the body 5104 and an extended position for climbing stairs, such as shown in FIGS. 51B and 51C, in which the track assembly 5102 is angled with respect to the body 5104.

In the embodiment shown in FIGS. 51A-51C, the track assembly 5102 includes a stabilizer leg 5110 that deploys to upon reaching the top of the stairs 5105 to contact the landing 5111, which provides stability to the body 5104 as the cart 5100 transitions from climbing the stairs 5105 to moving on flat ground at the landing 5111. Upon the cart 5100 drives again on relatively flat ground, the stabilizer leg 5110 may retract. In some cases, the stabilizer leg 5110 may pivot about line 5112 between a deployed position (FIG. 51C) and retracted position (FIGS. 51A-51B). In some embodiments, there may be a linear actuator 5114 and linkage assembly 5116 to pivot the stabilizer leg 5110 between deployed and retracted positions. As shown, the stabilizer leg 5110 pivots to the deployed position in an opposite direction (line 5112) from the direction the track assembly 5102 pivots (line 5106) to an extended position to climb stairs. In the embodiment shown, the distal end of the stabilizer leg 5110 includes a wheel 5114, but depending on the circumstances, this could be a low friction fixed member in some embodiments.

EXAMPLES

Illustrative examples of the technologies disclosed herein are provided below. An embodiment of the technologies may include any one or more, and any combination of, the examples described below.

Example 1 is an electronic cart with an electronic cart body including one or more internal compartments. The cart includes one or more wheels and/or a track assembly supporting the electronic cart body. One or more batteries are carried by the electronic cart body. The cart has a drive system to drive the one or more wheels and/or the track assembly, wherein the drive system is powered, at least in part, by the one or more batteries. One or more hand-operated cart controls are provided on the cart to adjust a speed with which the drive system drives the one or more wheels and/or the track assembly.

Example 2 includes the subject matter of Example 1, wherein the electronic cart body includes a front wall, a rear wall, side walls, a top wall, and a bottom wall, further comprising one or more doors on the top wall and/or one or more side walls to access one or more internal compartments.

Example 3 includes the subject matter of Examples 1-2, wherein the one or more doors on the top wall are configured to pivot about a substantially horizontal axis between an open position to access one or more internal compartments and a closed position to prevent access to the one or more internal compartments.

Example 4 includes the subject matter of Examples 1-3, wherein the one or more doors on the side walls is movable between an open position to access one or more internal compartments and a closed position to prevent access to the one or more internal compartments.

Example 5 includes the subject matter of Examples 1-4, wherein the door on one or more of the side walls is a roller-style door that slides between open and closed positions.

Example 6 includes the subject matter of Examples 1-5, wherein the one or more hand-operated cart controls are on the rear wall.

Example 7 includes the subject matter of Examples 1-6, wherein the rear wall includes a recessed area and at least a portion of the one or more hand-operated cart controls are within the recessed area.

Example 8 includes the subject matter of Examples 1-7, wherein the one or more hand-operated cart controls include a handle with one or more of speed control and/or forward/reverse movement control and/or brake control.

Example 9 includes the subject matter of Examples 1-8, wherein the handle is movable between a retracted position fully within the recessed area and an extended position in which at least a portion of the handle is outside the recessed area.

Example 10 includes the subject matter of Examples 1-9, wherein the handle pivots between the extended position and the retracted position.

Example 11 includes the subject matter of Examples 1-10, further comprising a platform extending from the rear wall, wherein the platform is configured to support a user in a ride-behind position.

Example 12 includes the subject matter of Examples 1-11, wherein the platform is movable between an extended position and a retracted position.

Example 13 includes the subject matter of Examples 1-12, wherein the electronic cart body includes both one or more wheels and the track assembly, wherein the drive system is configure to switch between driving (i) the one or more wheels or (ii) the track assembly.

Example 14 includes the subject matter of Examples 1-13, wherein the track assembly is movable between an extended position in which at least a portion of the track assembly contacts a ground and a retracted position in which the one or more wheels contact the ground.

Example 15 includes the subject matter of Examples 1-14, wherein the drive system is to switch between driving (i) the one or more wheels or (ii) the track assembly by moving the track assembly between the retracted position and the extended position.

Example 16 includes the subject matter of Examples 1-15, wherein the track assembly includes an end that is angled to traverse a curb or step.

Example 17 includes the subject matter of Examples 1-16, wherein the track assembly is pivotally connected with the electronic cart body.

Example 18 includes the subject matter of Examples 1-17, further comprising a linear actuator to pivot the track assembly with respect to the electronic cart body.

Example 19 includes the subject matter of Examples 1-18, further comprising a stabilizer leg movable between a retracted position retained within the track assembly and an extended position extending out of the track assembly.

Example 20 includes the subject matter of Examples 1-19, further comprising a linear actuator to move the stabilizer leg between the retracted position and the extended position.

Example 21 includes the subject matter of Examples 1-20, wherein the stabilizer leg pivots in a first direction and the track assembly pivots in a second direction opposite from the first direction.

Example 22 is an electronic cart for securely holding packages to be delivered at a drop off location. The cart includes an electronic cart body including a plurality of lockable compartments. One or more wheels and/or a track assembly support the electronic cart body. The cart includes one or more batteries carried by the electronic cart body. There is a drive system to drive the one or more wheels and/or the track assembly. The drive system is powered, at least in part, by the one or more batteries. The cart includes a locking control subsystem configured to control unlocking of the plurality of lockable compartments in response to wirelessly receiving unlock codes associated with respective lockable compartments.

Example 23 includes the subject matter of Example 22, wherein the unlock codes comprise a bar code and/or a QR code.

Example 24 includes the subject matter of Examples 22-23, further comprising a camera integral with the electronic cart body to scan the unlock codes, wherein the locking control subsystem is configured to unlock a lockable compartment associated with an unlock code in response to scanning the unlock code with the camera.

Example 25 includes the subject matter of Examples 22-24, wherein the locking control subsystem is configured to enter a package loading mode in which the locking control subsystem is programmable to associate respective unlock codes with the plurality of lockable compartments.

Example 26 includes the subject matter of Examples 22-25, wherein the locking control subsystem is configured to associate respective unlock codes with the plurality of lockable compartments in the package loading mode by (i) detecting a selected compartment based on a compartment being open and/or closing a compartment; and (ii) wirelessly scanning an unlock code to be associated with the selected compartment with the camera.

Example 27 is a method to securely hold packages at a drop off location. The method includes the step of providing a portable cart with a plurality of lockable compartments, wherein the portable cart includes a locking control subsystem to: (i) control unlocking of the plurality of lockable compartments in response to wirelessly receiving unlock codes associated with respective lockable compartments and (ii) enter into a package loading mode in which the locking control subsystem is programmable to associate respective unlock codes with the plurality of lockable compartments. The method includes the step of generating an unlock code for each respective package loaded into lockable compartments of the portable cart. A notification is sent to a package recipient with an unlock code associated with the package recipient's package. The method includes receiving a proposed unlock code via a wireless scanner of the portable cart. The method also includes the step of determining whether the proposed unlock code matches an unlock code associated with one or more of the plurality of lockable compartments. In response to the proposed unlock code matching the unlock code associated with one or more of the plurality of lockable compartments, the cart unlocks the one or more lockable compartments that match the proposed unlock code.

Example 28 is a side-loading delivery vehicle. The vehicle includes a body with a cab portion and a rear portion with a rear storage compartment, wherein the rear storage compartment includes a rear wall, a front wall separating the cab portion and the rear storage compartment, and side walls. There is also at least one side door on at least one of the side walls for accessing the rear storage compartment.

Example 29 includes the subject matter of Example 28, wherein the at least one side door is a roller-style door slidable between an open position and a closed position, wherein the at least one side door slides between the open position and the closed position along a substantially vertical axis.

Example 30 includes the subject matter of Examples 28-29, further comprising one or more partitions to divide the rear storage compartment into a plurality of storage compartments each dimensioned to receive the electronic cart body.

The invention claimed is:

1. An electronic cart comprising:
an electronic cart body including one or more internal compartments;
one or more wheels and/or a track assembly supporting the electronic cart body;
one or more batteries carried by the electronic cart body;

a drive system to drive the one or more wheels and/or the track assembly, wherein the drive system is powered, at least in part, by the one or more batteries;
one or more hand-operated cart controls to adjust a speed with which the drive system drives the one or more wheels and/or the track assembly;
wherein the one or more hand-operated cart controls are extendable from a recessed area of a rear wall of the electronic cart body;
wherein the one or more hand-operated cart controls comprises at least one handle that is movable between a retracted position fully within the recessed area and an extended position in which at least a portion of the at least one handle extends outside the recessed area; and
wherein the one or more hand-operated cart controls are configured to disable the drive system in response to the at least one handle moving to the retracted position.

2. The electronic cart of claim 1, wherein the electronic cart body includes a front wall, side walls, a top wall, and a bottom wall, further comprising one or more doors on the top wall and/or one or more side walls to access one or more internal compartments.

3. The electronic cart of claim 2, wherein the one or more doors on the top wall are configured to pivot about a substantially horizontal axis between an open position to access one or more internal compartments and a closed position to prevent access to the one or more internal compartments.

4. The electronic cart of claim 2, wherein the one or more doors on the side walls is movable between an open position to access one or more internal compartments and a closed position to prevent access to the one or more internal compartments.

5. The electronic cart of claim 4, wherein the door on one or more of the side walls is a roller-style door that slides between open and closed positions.

6. The electronic cart of claim 2, wherein the one or more hand-operated cart controls actuate one or more of forward/reverse movement control and/or brake control.

7. The electronic cart of claim 2, further comprising a platform extending from the rear wall, wherein the platform is configured to support a user in a ride-behind position.

8. The electronic cart of claim 7, wherein the platform is movable between an extended position and a retracted position.

9. The electronic cart of claim 2, wherein the track assembly is pivotally connected with the electronic cart body.

10. The electronic cart of claim 9, further comprising a linear actuator to pivot the track assembly with respect to the electronic cart body.

11. The electronic cart of claim 10, further comprising a stabilizer leg movable between a retracted position retained within the track assembly and an extended position extending out of the track assembly.

12. The electronic cart of claim 11, further comprising a linear actuator to move the stabilizer leg between the retracted position and the extended position.

13. The electronic cart of claim 12, wherein the stabilizer leg pivots in a first direction and the track assembly pivots in a second direction opposite from the first direction.

14. The electronic cart of claim 1, wherein the at least one handle pivots between the extended position and the retracted position about a pivot point that has a fixed position within the recessed area.

15. The electronic cart of claim 1, wherein the electronic cart body includes both one or more wheels and the track assembly, wherein the drive system is configure to switch between driving (i) the one or more wheels or (ii) the track assembly.

16. The electronic cart of claim 15, wherein the track assembly is movable between an extended position in which at least a portion of the track assembly contacts a ground and a retracted position in which the one or more wheels contact the ground.

17. The electronic cart of claim 16, wherein the drive system is to switch between driving (i) the one or more wheels or (ii) the track assembly by moving the track assembly between the retracted position and the extended position.

18. The electronic cart of claim 16, wherein the track assembly includes an end that is angled to traverse a curb or step.

19. The electronic cart of claim 1, wherein the one or more hand-operated cart controls are configured to electronically move the at least one handle between the extended and retracted positions.

20. The electronic cart of claim 19, wherein the one or more hand-operated cart controls are configured to automatically move the at least one handle to the extended position in response to detecting a keyfob within a terminal wireless range.

21. The electronic cart of claim 20, wherein the one or more hand-operated cart controls are configured to automatically move the at least one handle to the retracted position in response to detecting the keyfob has moved outside the terminal wireless range.

22. The electronic cart of claim 1, further comprising a temperature control system to control a temperature within one or more of the internal compartments, wherein the one or more hand-operated cart controls include a temperature control to adjust the temperature within one or more of the internal compartments.

\* \* \* \* \*